United States Patent
Lumsden

(10) Patent No.: US 8,085,010 B2
(45) Date of Patent: Dec. 27, 2011

(54) TRIAC/SCR-BASED ENERGY SAVINGS DEVICE FOR REDUCING A PREDETERMINED AMOUNT OF VOLTAGE USING PULSE WIDTH MODULATION

(75) Inventor: John L Lumsden, Boca Raton, FL (US)

(73) Assignee: The Powerwise Group, Inc., Boca Raton, FL (US)

(*) Notice: Subject to any disclaimer, the term of this patent is extended or adjusted under 35 U.S.C. 154(b) by 702 days.

(21) Appl. No.: 12/187,136

(22) Filed: Aug. 6, 2008

(65) Prior Publication Data

US 2009/0051344 A1 Feb. 26, 2009

Related U.S. Application Data

(60) Provisional application No. 60/966,124, filed on Aug. 24, 2007, provisional application No. 61/009,844, filed on Jan. 3, 2008, provisional application No. 61/009,846, filed on Jan. 3, 2008, provisional application No. 61/009,806, filed on Jan. 3, 2008.

(51) Int. Cl.
*G05F 1/00* (2006.01)

(52) U.S. Cl. ......... 323/239; 323/223; 323/224; 323/225

(58) Field of Classification Search .................. 323/237, 323/241, 244, 266, 274, 283, 300, 320, 322, 323/223, 224, 225, 239
See application file for complete search history.

(56) References Cited

U.S. PATENT DOCUMENTS

| | | | |
|---|---|---|---|
| 2,276,358 A | 3/1942 | Vickers | |
| 3,470,443 A | 9/1969 | Nola et al. | |
| 3,470,446 A | 9/1969 | Nola et al. | |
| 3,523,228 A | 8/1970 | Nola et al. | |
| 3,541,361 A | 11/1970 | Nola | |
| 3,582,774 A | 6/1971 | Forgacs | |
| 3,671,849 A | 6/1972 | Kingston | |
| 3,718,846 A | 2/1973 | Bejach | |
| 3,740,629 A | 6/1973 | Kohlhagen | |
| 3,753,472 A | 8/1973 | Dybwad et al. | |

(Continued)

FOREIGN PATENT DOCUMENTS

EP 1650860 B1 8/2008

(Continued)

OTHER PUBLICATIONS

U.S. Appl. No. 12/185,442, Lumsden.

(Continued)

*Primary Examiner* — Adolf Berhane
*Assistant Examiner* — Lakaisha Jackson
(74) *Attorney, Agent, or Firm* — Strasburger & Price, LLP

(57) ABSTRACT

A TRIAC/SCR-based energy savings device, system and method (1) wherein a predetermined amount of voltage below a nominal line voltage and/or below a nominal appliance voltage is saved, thereby conserving energy. Phase input connections (2) are provided for inputting analog signals into the device and system (1). A magnetic flux concentrator (3) senses the incoming analog signal (20) and a volts zero crossing point detector (5) determines the zero volts crossing point (21) of the signal (20). The positive half cycle (22) and negative half cycle (23) of the signal (20) are identified and routed to a digital signal processor (10) for processing the signal (20). The signal (20) is reduced by pulse width modulation and the reduced amount of energy is outputted, thereby yielding an energy savings for an end user.

66 Claims, 12 Drawing Sheets

U.S. PATENT DOCUMENTS

| | | | |
|---|---|---|---|
| 3,860,858 A | 1/1975 | Nola | |
| 3,959,719 A | 5/1976 | Espelage | |
| 3,976,987 A | 8/1976 | Anger | |
| 4,039,946 A | 8/1977 | Nola | |
| 4,052,648 A | 10/1977 | Nola | |
| 4,096,436 A | 6/1978 | Cook et al. | |
| 4,168,491 A | 9/1979 | Phillips et al. | |
| 4,266,177 A | 5/1981 | Nola | |
| 4,333,046 A | 6/1982 | Lee | |
| 4,346,339 A | 8/1982 | Lewandowski | |
| 4,353,025 A | 10/1982 | Dobkin | |
| 4,388,585 A | 6/1983 | Nola | |
| 4,400,657 A | 8/1983 | Nola | |
| 4,404,511 A | 9/1983 | Nola | |
| 4,412,167 A | 10/1983 | Green et al. | |
| 4,417,190 A | 11/1983 | Nola | |
| 4,426,614 A | 1/1984 | Nola | |
| 4,429,269 A | 1/1984 | Brown | |
| 4,433,276 A | 2/1984 | Nola | |
| 4,439,718 A | 3/1984 | Nola | |
| 4,456,871 A | 6/1984 | Stich | |
| 4,469,998 A | 9/1984 | Nola | |
| 4,489,243 A | 12/1984 | Nola | |
| 4,513,240 A | 4/1985 | Putman | |
| 4,513,274 A | 4/1985 | Halder | |
| 4,616,174 A | 10/1986 | Jorgensen | |
| 4,644,234 A | 2/1987 | Nola | |
| 4,649,287 A | 3/1987 | Nola | |
| 4,659,981 A | 4/1987 | Lumsden | |
| 4,689,548 A | 8/1987 | Mechlenburg | |
| 4,706,017 A | 11/1987 | Wilson | |
| 4,819,180 A | 4/1989 | Hedman et al. | |
| 4,859,926 A | 8/1989 | Wolze | |
| 4,876,468 A | 10/1989 | Libert | |
| 5,003,192 A | 3/1991 | Beigel | |
| 5,066,896 A | 11/1991 | Bertenshaw et al. | |
| 5,134,356 A | 7/1992 | El-Sharkawl et al. | |
| 5,136,216 A | 8/1992 | Wills et al. | |
| 5,180,970 A | 1/1993 | Ross | |
| 5,202,621 A | 4/1993 | Reischer | |
| 5,214,621 A | 5/1993 | Maggelet et al. | |
| 5,227,735 A | 7/1993 | Lumsden | |
| 5,239,255 A | 8/1993 | Schanin et al. | |
| 5,259,034 A | 11/1993 | Lumsden | |
| 5,299,266 A | 3/1994 | Lumsden | |
| 5,332,965 A | 7/1994 | Wolf et al. | |
| 5,350,988 A | 9/1994 | Le | |
| 5,362,206 A | 11/1994 | Westerman et al. | |
| 5,442,335 A | 8/1995 | Cantin et al. | |
| 5,481,140 A | 1/1996 | Maruyama et al. | |
| 5,481,225 A | 1/1996 | Lumsden et al. | |
| 5,500,562 A | 3/1996 | Kelley | |
| 5,506,484 A | 4/1996 | Munro et al. | |
| 5,543,667 A | 8/1996 | Shavit et al. | |
| 5,602,689 A | 2/1997 | Kadlec et al. | |
| 5,614,811 A | 3/1997 | Sagalovich et al. | |
| 5,615,097 A | 3/1997 | Cross | |
| 5,625,236 A | 4/1997 | Lefebvre et al. | |
| 5,635,826 A | 6/1997 | Sugawara | |
| 5,637,975 A | 6/1997 | Pummer et al. | |
| 5,652,504 A * | 7/1997 | Bangerter | 323/239 |
| 5,699,276 A | 12/1997 | Roos | |
| 5,732,109 A | 3/1998 | Takahashi | |
| 5,747,972 A | 5/1998 | Baretich et al. | |
| 5,754,036 A | 5/1998 | Walker | |
| 5,828,200 A | 10/1998 | Ligman et al. | |
| 5,828,671 A | 10/1998 | Vela et al. | |
| 5,880,578 A | 3/1999 | Oliveira et al. | |
| 5,909,138 A | 6/1999 | Stendahl | |
| 5,942,895 A | 8/1999 | Popovich et al. | |
| 5,945,746 A | 8/1999 | Tracewell et al. | |
| 5,994,898 A | 11/1999 | DiMarzio et al. | |
| 6,005,367 A | 12/1999 | Rohde | |
| 6,013,999 A | 1/2000 | Nola et al. | |
| 6,118,239 A | 9/2000 | Kadah | |
| 6,184,672 B1 | 2/2001 | Berkcan | |
| 6,191,568 B1 | 2/2001 | Poletti | |
| 6,198,312 B1 | 3/2001 | Floyd | |
| 6,225,759 B1 | 5/2001 | Bogdan et al. | |
| 6,259,610 B1 | 7/2001 | Matthias et al. | |
| 6,265,881 B1 | 7/2001 | Meliopoulos et al. | |
| 6,274,999 B1 | 8/2001 | Fujii et al. | |
| 6,297,610 B1 | 10/2001 | Bauer | |
| 6,326,773 B1 | 12/2001 | Okuma et al. | |
| 6,346,778 B1 | 2/2002 | Mason et al. | |
| 6,351,400 B1 | 2/2002 | Lumsden | |
| 6,400,098 B1 | 6/2002 | Pun | |
| 6,414,455 B1 | 7/2002 | Watson | |
| 6,414,475 B1 | 7/2002 | Dames et al. | |
| 6,426,632 B1 | 7/2002 | Clunn | |
| 6,449,567 B1 | 9/2002 | Desai et al. | |
| 6,459,606 B1 | 10/2002 | Jadric | |
| 6,483,247 B2 | 11/2002 | Edwards et al. | |
| 6,486,641 B2 | 11/2002 | Scoggins et al. | |
| 6,489,742 B2 | 12/2002 | Lumsden | |
| 6,490,872 B1 | 12/2002 | Beck et al. | |
| 6,528,957 B1 | 3/2003 | Luchaco | |
| 6,548,988 B2 | 4/2003 | Duff, Jr. | |
| 6,553,353 B1 | 4/2003 | Littlejohn | |
| 6,599,095 B1 | 7/2003 | Takada et al. | |
| 6,643,149 B2 | 11/2003 | Arnet et al. | |
| 6,657,404 B1 | 12/2003 | Clark et al. | |
| 6,662,821 B2 | 12/2003 | Jacobsen et al. | |
| 6,664,771 B2 | 12/2003 | Scoggins et al. | |
| 6,678,176 B2 | 1/2004 | Lumsden | |
| 6,690,594 B2 | 2/2004 | Amarillas et al. | |
| 6,690,704 B2 | 2/2004 | Fallon et al. | |
| 6,718,213 B1 | 4/2004 | Enberg | |
| 6,747,368 B2 | 6/2004 | Jarrett, Jr. | |
| 6,774,610 B2 | 8/2004 | Orozco | |
| 6,781,423 B1 | 8/2004 | Knoedgen | |
| 6,801,022 B2 | 10/2004 | Fa | |
| 6,836,099 B1 | 12/2004 | Amarillas et al. | |
| 6,849,834 B2 | 2/2005 | Smolenski et al. | |
| 6,912,911 B2 | 7/2005 | Oh et al. | |
| 6,952,355 B2 | 10/2005 | Riggio et al. | |
| 6,963,195 B1 | 11/2005 | Berkcan | |
| 6,963,773 B2 | 11/2005 | Waltman et al. | |
| 7,010,363 B2 | 3/2006 | Donnelly et al. | |
| 7,019,474 B2 | 3/2006 | Rice et al. | |
| 7,019,498 B2 | 3/2006 | Pippin et al. | |
| 7,019,992 B1 | 3/2006 | Weber | |
| 7,019,995 B2 | 3/2006 | Niemand et al. | |
| 7,045,913 B2 | 5/2006 | Ebrahim et al. | |
| 7,049,758 B2 | 5/2006 | Weyhrauch et al. | |
| 7,049,976 B2 | 5/2006 | Hunt et al. | |
| 7,061,189 B2 | 6/2006 | Newman, Jr. et al. | |
| 7,062,361 B1 | 6/2006 | Lane | |
| 7,068,184 B2 | 6/2006 | Yee et al. | |
| 7,081,729 B2 | 7/2006 | Chang et al. | |
| 7,106,031 B2 | 9/2006 | Hayakawa et al. | |
| 7,119,576 B1 | 10/2006 | Langhammer et al. | |
| 7,136,724 B2 | 11/2006 | Enberg | |
| 7,157,898 B2 | 1/2007 | Hastings et al. | |
| 7,164,238 B2 | 1/2007 | Kazanov et al. | |
| 7,188,260 B1 | 3/2007 | Shaffer et al. | |
| 7,211,982 B1 | 5/2007 | Chang et al. | |
| 7,250,748 B2 | 7/2007 | Hastings et al. | |
| 7,256,564 B2 | 8/2007 | MacKay | |
| 7,259,546 B2 | 8/2007 | Hastings et al. | |
| 7,263,450 B2 | 8/2007 | Hunter | |
| 7,279,860 B2 | 10/2007 | MacKay | |
| 7,288,911 B2 | 10/2007 | MacKay | |
| 7,298,132 B2 | 11/2007 | Woolsey et al. | |
| 7,298,133 B2 | 11/2007 | Hastings et al. | |
| 7,309,973 B2 | 12/2007 | Garza | |
| 7,336,463 B2 | 2/2008 | Russell et al. | |
| 7,336,514 B2 | 2/2008 | Amarillas et al. | |
| 7,349,765 B2 | 3/2008 | Reaume et al. | |
| 7,358,724 B2 | 4/2008 | Taylor et al. | |
| 7,378,821 B2 | 5/2008 | Simpson, III | |
| 7,386,713 B2 | 6/2008 | Madter et al. | |
| 7,394,397 B2 | 7/2008 | Nguyen et al. | |
| 7,397,212 B2 | 7/2008 | Turner | |
| 7,412,185 B2 | 8/2008 | Hall et al. | |
| 7,417,410 B2 | 8/2008 | Clark, III et al. | |
| 7,417,420 B2 | 8/2008 | Shuey et al. | |

| | | | |
|---|---|---|---|
| 7,436,233 B2 | 10/2008 | Yee et al. | |
| 7,446,514 B1 | 11/2008 | Li et al. | |
| 7,528,503 B2 | 5/2009 | Rognli et al. | |
| 7,602,136 B2 | 10/2009 | Garza | |
| 7,605,495 B2 | 10/2009 | Achart | |
| 7,719,214 B2 | 5/2010 | Leehey | |
| 7,791,326 B2 * | 9/2010 | Dahlman et al. | 323/284 |
| 7,902,788 B2 | 3/2011 | Garza | |
| 7,919,958 B2 | 4/2011 | Oettinger et al. | |
| 8,004,255 B2 | 8/2011 | Lumsden | |
| 2001/0010032 A1 | 7/2001 | Ehlers et al. | |
| 2002/0071405 A1 | 6/2002 | Kelley et al. | |
| 2002/0109477 A1 | 8/2002 | Ikezawa | |
| 2003/0090362 A1 | 5/2003 | Hardwick | |
| 2003/0181288 A1 | 9/2003 | Phillippe | |
| 2004/0153170 A1 | 8/2004 | Santacatterina et al. | |
| 2004/0181698 A1 | 9/2004 | Williams | |
| 2004/0189265 A1 * | 9/2004 | Rice et al. | 323/234 |
| 2004/0239335 A1 | 12/2004 | McClelland et al. | |
| 2005/0033951 A1 | 2/2005 | Madter et al. | |
| 2005/0068013 A1 | 3/2005 | Scoggins | |
| 2005/0073295 A1 | 4/2005 | Hastings et al. | |
| 2005/0189929 A1 | 9/2005 | Schulz | |
| 2006/0103365 A1 | 5/2006 | Ben-Yaacov | |
| 2006/0175674 A1 | 8/2006 | Taylor et al. | |
| 2006/0276938 A1 | 12/2006 | Miller | |
| 2007/0024250 A1 | 2/2007 | Simson, III | |
| 2007/0024264 A1 | 2/2007 | Lestician | |
| 2007/0037567 A1 | 2/2007 | Ungless | |
| 2007/0069668 A1 | 3/2007 | MacKay | |
| 2007/0071047 A1 | 3/2007 | Huang et al. | |
| 2007/0213776 A1 | 9/2007 | Brink | |
| 2007/0244603 A1 | 10/2007 | Level | |
| 2007/0279053 A1 | 12/2007 | Taylor et al. | |
| 2007/0283175 A1 | 12/2007 | Marinkovic et al. | |
| 2007/0290645 A1 | 12/2007 | Boyadjieff et al. | |
| 2007/0300084 A1 | 12/2007 | Goodrum et al. | |
| 2007/0300085 A1 | 12/2007 | Goodrum et al. | |
| 2008/0005044 A1 | 1/2008 | Benya et al. | |
| 2008/0043506 A1 | 2/2008 | Ozaki et al. | |
| 2008/0049452 A1 | 2/2008 | Van Bodegraven | |
| 2008/0084200 A1 | 4/2008 | Kojori | |
| 2008/0084201 A1 | 4/2008 | Kojori | |
| 2008/0104430 A1 | 5/2008 | Malone et al. | |
| 2008/0116825 A1 | 5/2008 | Descarries et al. | |
| 2008/0121448 A1 | 5/2008 | Betz et al. | |
| 2008/0177678 A1 | 7/2008 | Di Martini et al. | |
| 2008/0221737 A1 | 9/2008 | Josephson et al. | |
| 2008/0272934 A1 | 11/2008 | Wang et al. | |
| 2008/0281473 A1 | 11/2008 | Pitt | |
| 2008/0290731 A1 | 11/2008 | Cassidy | |
| 2008/0291607 A1 | 11/2008 | Braunstein et al. | |
| 2009/0018706 A1 | 1/2009 | Wittner | |
| 2009/0045804 A1 | 2/2009 | Durling et al. | |
| 2009/0046490 A1 * | 2/2009 | Lumsden | 363/124 |
| 2009/0051344 A1 | 2/2009 | Lumsden | |
| 2009/0062970 A1 | 3/2009 | Forbes, Jr. et al. | |
| 2009/0063228 A1 | 3/2009 | Forbes, Jr. | |
| 2009/0083167 A1 | 3/2009 | Subbloie | |
| 2009/0085545 A1 | 4/2009 | Shen et al. | |
| 2009/0088907 A1 | 4/2009 | Lewis et al. | |
| 2009/0094173 A1 | 4/2009 | Smith et al. | |
| 2009/0105888 A1 | 4/2009 | Flohr et al. | |
| 2009/0154206 A1 | 6/2009 | Fouquet et al. | |
| 2009/0160267 A1 | 6/2009 | Kates | |
| 2009/0189581 A1 | 7/2009 | Lawson et al. | |
| 2009/0200981 A1 | 8/2009 | Lumsden | |
| 2010/0001704 A1 | 1/2010 | Williams | |
| 2010/0013427 A1 | 1/2010 | Kelley | |
| 2010/0033155 A1 | 2/2010 | Lumsden | |
| 2010/0117588 A9 | 5/2010 | Kelley | |
| 2010/0320956 A1 | 12/2010 | Lumsden et al. | |
| 2011/0080130 A1 | 4/2011 | Venkataraman | |
| 2011/0121775 A1 | 5/2011 | Garza | |
| 2011/0182094 A1 | 7/2011 | Lumsden et al. | |

FOREIGN PATENT DOCUMENTS

| | | | |
|---|---|---|---|
| JP | 11-007328 A | 1/1999 | |
| JP | 11-241687 A | 9/1999 | |
| JP | 2001-245496 | 9/2001 | |
| JP | 2010-502533 A | 1/2010 | |
| KR | 10-2001-0006838 A | 1/2001 | |
| KR | 10-2009-0009872 | 1/2009 | |
| WO | WO 00-66892 | 11/2000 | |

OTHER PUBLICATIONS

International Search Report for International Application No. PCT/US2008/009482, dated Nov. 6, 2008 (2 pages).

Written Opinion of the International Search Authority for International Application No. PCT/US2008/009482, dated Nov. 6, 2008 (11 pages).

International Search Report for International Application No. PCT/US2008/009483, dated Nov. 18, 2008 (2 pages).

Written Opinion of the International Search Authority for International Application No. PCT/US2008/009483, dated Nov. 18, 2008 (6 pages).

International Search Report for International Application No. PCT/US2008/009533, dated Oct. 6, 2008 (2 pages).

Written Opinion of the International Search Authority for International Application No. PCT/US2008/009533, dated Oct. 6, 2008 (5 pages).

International Search Report for International Application No. PCT/US2008/010720, dated Nov. 25, 2008 (2 pages).

Written Opinion of the International Search Authority for International Application No. PCT/US2008/010720, dated Nov. 25, 2008 (4 pages).

International Search Report for International Application No. PCT/US2008/009393, dated Oct. 6, 2008 (3 pages).

Written Opinion of the International Search Authority for International Application No. PCT/US2008/009393, dated Oct. 6, 2008 (13 pages).

Frick, Vincent, et al., "CMOS Microsystem for AC Current Measurement with Galvanic Isolation," IEEE Sensors Journal, vol. 3, No. 6, pp. 752-760, 2003 IEEE (9 pages).

First Non-Final Office Action mailed Feb. 3, 2011, U.S. Appl. No. 12/187,186, filed Aug. 6, 2008, (19 pages).

Response and Amendment to First Non-Final Office Action, U.S. Appl. No. 12/187,186, filed Aug. 6, 2008, (32 pages).

Final Office Action mailed Jun. 13, 2011, U.S. Appl. No. 12/187,186, filed Aug. 6, 2008, (23 pages).

PCT Notification of Transmittal of The International Search Report and the Written Opinion of the International Searching Authority, or the Declaration, from the International Searching Authority Korea (ISA/KR) Korean Intellectual Property Office mailed Sep. 7, 2011; corresponding to U.S. Appl. No. 12/967,128, now Publication No. US2011/0080130 Al (our file No. 133) (9 pages).

Extended European Search Report, European Patent Office, for Application No. 08795029.1-1242/2183849 PCT/US2008009393 dated Aug. 1, 2011; corresponding U.S. Appl. No. 12/185,442, now Publication No. US2009/0046490 A1 (our file No. 113) (10 pages).

PCT Notification of Transmittal of The International Search Report and the Written Opinion of the International Searching Authority, or the Declaration, from the International Searching Authority Korea (ISA/KR) Korean Intellectual Property Office mailed Jun. 29, 2011 corresponding to U.S. Appl. No. 12/893,539 (not yet published) (our file No. 127) (8 pages).

English language translation of Japanese Patent JP-11-007328 A above (13 pages).

English language translation of Japanese Patent JP 11241687 above (16 pages).

English language translation of Japanese Patent JP 2001-245496 above (14 pages).

English language translation of Japanese Patent JP 2010-502533 A above (16 pages).

PCT Notification of Transmittal of The International Search Report and the Written Opinion of the International Searching Authority, or the Declaration, from the International Searching Authority USA (ISA/US) mailed Oct. 6, 2008; corresponding to U.S. Appl. No. 12/185,442, now Publication No. US2009/0046490 A1 (our file No. 113) (15 pages).

Frick, Vincent, Member, IEEE; Hebrard, Luc, Member, IEEE; Poure, Phillippe; Anstotz, Freddy; Braun, Francis; "CMOS Microsystem for AC Current Measurement with Galvanic Isolation"; IEEE Sensors Journal, vol. 3, No. 6, Dec. 2003; see NPL-H (our file 113) where considered a "Y" reference (9 pages).

PCT Notification Concerning Transmittal of Copy of International Preliminary Report on Patentability mailed Feb. 20, 2010 from the International Bureau of WIPO; corresponding to U.S. Appl. No. 12/185,442, now Publication No. US2009/0046490 A1 (our file No. 113) (14 pages).

PCT Notification of Transmittal of The International Search Report and the Written Opinion of the International Searching Authority, or the Declaration, from the International Searching Authority USA (ISA/US) mailed Nov. 6, 2008; corresponding to U.S. Appl. No. 12/187,136, now Publication No. US2009/0051344 A1 (our file No. 114) (15 pages).

PCT Notification of Transmittal of The International Search Report and the Written Opinion of the International Searching Authority, or the Declaration, from the International Searching Authority USA (ISA/US) mailed Nov. 18, 2008; corresponding to U.S. Appl. No. 12/187,186, now Publication No. US2009/0200981 A1 (our file No. 115) (9 pages).

PCT Notification of Transmittal of The International Search Report and the Written Opinion of the International Searching Authority, or the Declaration, from the International Searching Authority USA (ISA/US) mailed Oct. 6, 2008; corresponding to U.S. Appl. No. 12/187,805, now Publication No. US2010/0033155 A1 (our file No. 116) (7 pages).

PCT Notification Concerning Transmittal of Copy of International Preliminary Report on Patentability mailed Feb. 17, 2011 from the International Bureau of WIPO; International Application No. PCT/US2008/009533 corresponding to U.S. Appl. No. 12/187,805, now Publication No. US2010/0033155 A1 (our file No. 116) (6 pages).

PCT Notification of Transmittal of The International Search Report and the Written Opinion of the International Searching Authority, or the Declaration, from the International Searching Authority USA (ISA/US) mailed Nov. 25, 2008; corresponding to International Application No. PCT/US 08/10720 and U.S. Appl. No. 12/207,913, now Publication No. US2010/0013427 A1 (our file No. 117) (8 pages).

PCT Notification Concerning Transmittal of Copy of International Preliminary Report on Patentability mailed Mar. 25, 2010 from the International Bureau of WIPO; corresponding to International Application No. PCT/US2008/1010720 and U.S. Appl. No. 12/207,913, now Publication No. US2010-0013427 A1 (our file No. 117) (7 pages).

English language translation of Official Action from the Eurasian Patent Office pertaining to Application No. 201070369/(OFE/1004/0111) and original Office Action both corresponding to PCT Application No. US 2008/010720 dated Apr. 26, 2011 and U.S. Appl. No. 12/207,913, now Publication No. US2010/0013427 A1 (our file No. 117) (2 pages).

PCT Notification of Transmittal of The International Search Report and the Written Opinion of the International Searching Authority, or the Declaration, from the International Searching Authority USA (ISA/US), mailed Oct. 15, 2010; corresponding to U.S. Appl. No. 12/873,510, now Publication No. US2010/0320956 A1 (our file No. 123) (11 pages).

* cited by examiner

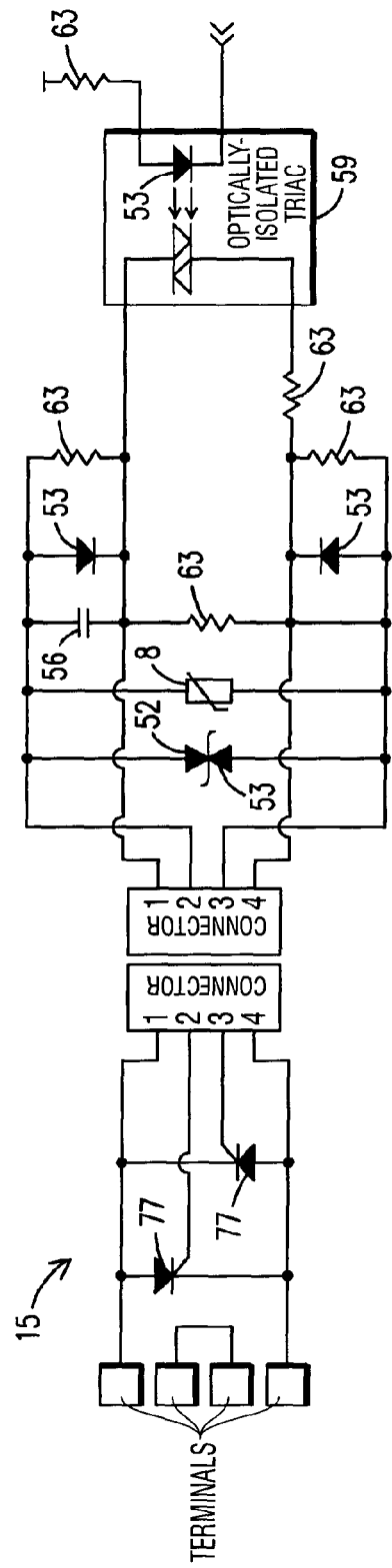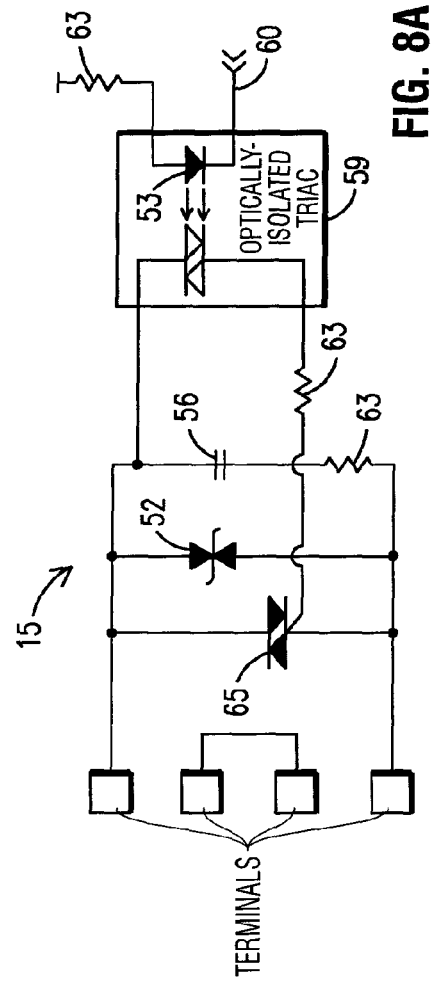
FIG. 8B
FIG. 8A

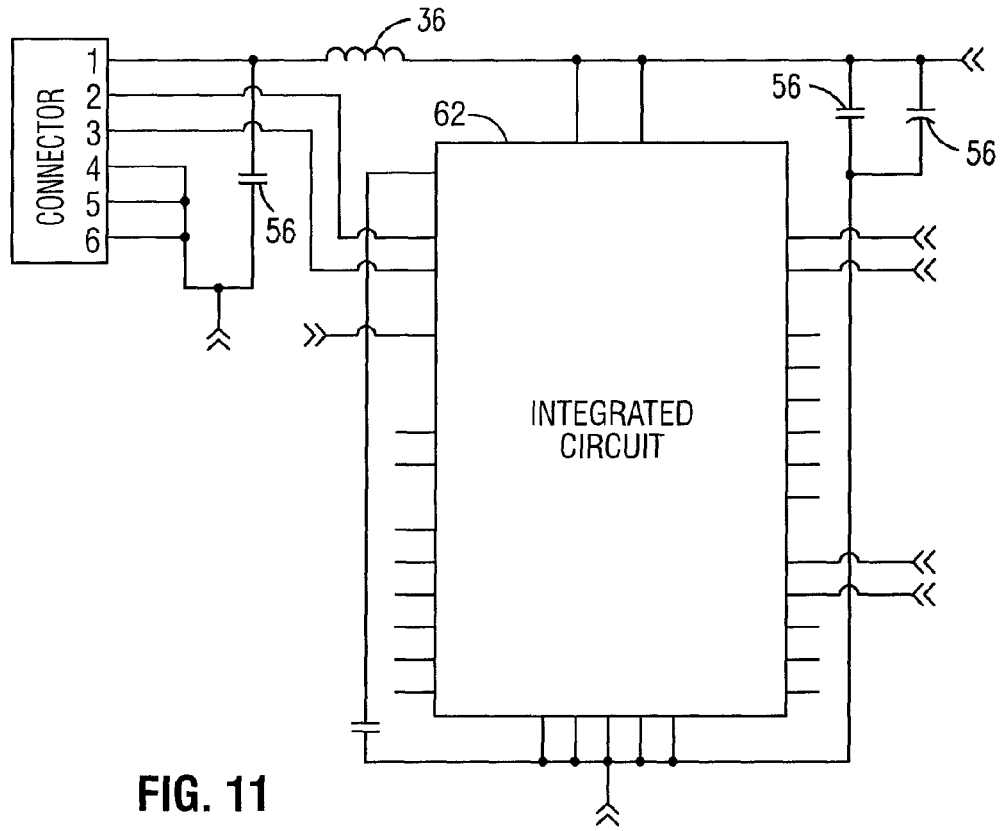
FIG. 11
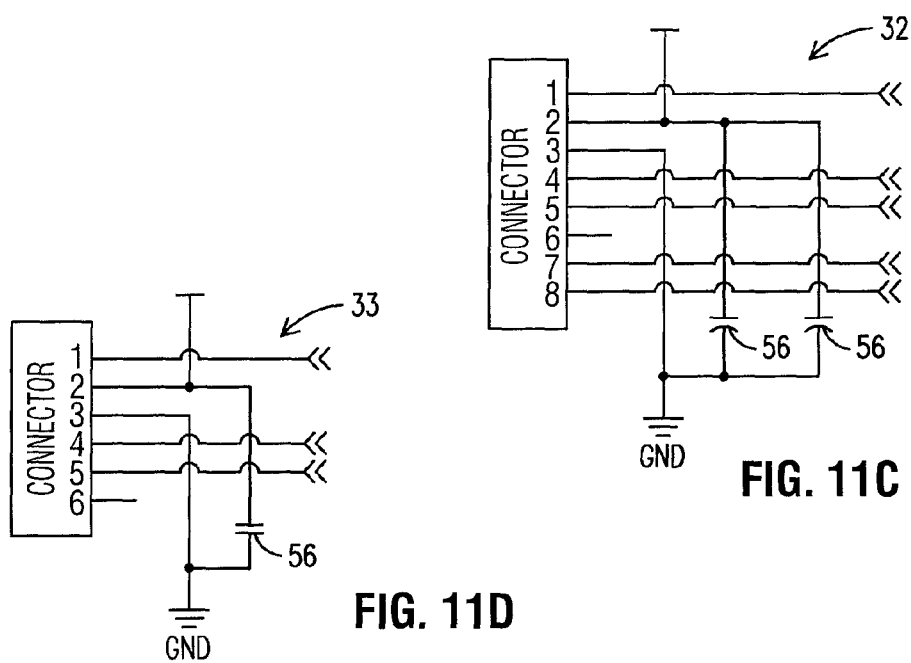
FIG. 11C
FIG. 11D

Settings

Operational Mode
- ○ Voltage Regulation (RMS)
- ● Voltage Reduction (%)
- ○ Savings Reduction (%)

Phase
- ○ Single Phase
- ○ Bi-Phase
- ● Three Phase

Setpoints

Operational Mode: Voltage Reduction

*Voltage Regulation*
Setpoint (RMS): 107.0

*Voltage Reduction*
Voltage Reduction (%): 9
Lower Limit (RMS): 107.0

*Savings Reduction*
Savings Reduction (%): 0
Lower Limit (RMS): 107.0

Operational Mode
Enable Random Start ☑
Soft Start Time (Secs): 2

Calibration

| | PH-1 | Ph-2 | Ph-3 |
|---|---|---|---|
| Input Calibration Factor | 1.00 | 1.00 | 1.00 |
| Output Calibration Factor | 1.00 | 1.00 | 1.00 |
| Current Calibration Factor | 1.00 | 1.00 | 1.00 |

● Right Rotation ○ Left Rotation

[ OK ]  [ Cancel ]

FIG. 12

TRIAC/SCR-BASED ENERGY SAVINGS DEVICE FOR REDUCING A PREDETERMINED AMOUNT OF VOLTAGE USING PULSE WIDTH MODULATION

CROSS REFERENCE TO RELATED APPLICATIONS

This application claims the benefit of U.S. Provisional Application Nos. 60/966,124 filed Aug. 24, 2007; 61/009,844 filed Jan. 3, 2008; 61/009,846 filed Jan. 3, 2008; and 61/009,806 filed Jan. 3, 2008.

BACKGROUND OF THE INVENTION

This invention relates to energy control savings devices and systems, more particularly, a triode alternating current switch/silicone controlled rectifier (TRIAC/SCR) based energy control savings device, system and method for use wherein a predetermined amount of voltage below a nominal line voltage and/or below a nominal appliance voltage is saved, thereby conserving energy.

Since the industrial revolution, the world's consumption of energy has grown at a steady rate. Most power generated and energy consumed is from the combustion of fossil fuels, a nonrenewable, natural resource that is rapidly becoming depleted. As the depletion of Earth's natural resources continues, power generation and energy conservation has become an increasingly important issue with governments in both this country and abroad. In addition, not only are governments concerned with power generation and energy conservation, but businesses and consumers are also concerned as the costs for such resources are rapidly increasing.

Not only do there exist worldwide concerns with power generation and energy conservation, but there also exist concerns with power distribution as well, especially in emerging economies. Although power generation and energy conservation are of great importance, the problem of power distribution is also of great concern as it involves existing infrastructure that is usually inadequate for properly distributing power and not readily suitable to be improved upon. This problematical situation is manifested by "brown outs" wherein a nominal AC voltage cannot be maintained in the face of a grid/generation overload.

Currently, governmental entities and power companies attempt to remedy brown out occurrences by elevating the AC voltage or adding power shedding generation at appropriate locations on the power grid. This method usually results in a wide disparity of voltages available to consumers in homes and/or business. The voltage increases may range from ten percent to fifteen percent (10%-15%) and, since power is calculated by Voltage$^2$/load, the result of the governmental entities' and power companies' "remedy" can result in increased charges to the consumer of up to twenty-five percent (25%). Thus, rather than conserving energy, governmental entities and power companies are expending energy.

Furthermore, although most appliances and equipment used in businesses and homes are capable of performing, exactly to specification, at the nominal voltage minus ten percent (10%), most energy savings devices do not exploit this feature. Thus, a further potential for energy savings is oftentimes ignored.

Therefore, a need exists for a TRIAC/SCR-based energy savings device, system and method wherein a predetermined amount of voltage below a nominal line voltage and/or below a nominal appliance voltage is saved, thereby conserving energy.

The relevant prior art includes the following references:

| Patent/Ser. No. (U.S. unless stated otherwise) | Inventor | Issue/Publication Date |
| --- | --- | --- |
| 6,664,771 | Scoggins et al. | Dec. 16, 2003 |
| 6,486,641 | Scoggins et al. | Nov. 26, 2002 |
| 2005/0068013 | Scoggins | Mar. 31, 2005 |
| 6,489,742 | Lumsden | Dec. 03, 2002 |
| 7,010,363 | Donnelly et al. | Mar. 07, 2006 |
| 5,652,504 | Bangerter | Jul. 29, 1997 |
| 5,625,236 | Lefebvre et al. | Apr. 29, 1997 |
| 5,543,667 | Shavit et al. | Aug. 06, 1996 |
| 5,442,335 | Cantin et al. | Aug. 15, 1995 |
| 5,134,356 | El-Sharkawi et al. | Jul. 28, 1992 |
| 5,003,192 | Beigel | Mar. 26, 1991 |
| 3,959,719 | Espelage | May 25, 1976 |
| 4,706,017 | Wilson | Nov. 10, 1987 |
| 2007/0279053 | Taylor et al. | Dec. 06, 2007 |
| 6,963,195 | Berkcan | Nov. 08, 2005 |
| 6,184,672 | Berkcan | Feb. 06, 2001 |
| 3,582,774 | Forgacs | Jun. 01, 1971 |
| 5,994,898 | DiMarzio et al. | Nov. 30, 1999 |
| 7,358,724 | Taylor et al. | Apr. 15, 2008 |
| 7,259,546 | Hastings et al. | Aug. 21, 2007 |
| 7,250,748 | Hastings et al. | Jul. 31, 2007 |
| 7,298,132 | Woolsey et al. | Nov. 20, 2007 |
| 7,298,133 | Hastings et al. | Nov. 20, 2007 |
| 7,157,898 | Hastings et al. | Jan. 02, 2007 |
| 6,912,911 | Oh et al. | Jul. 05, 2005 |
| 5,180,970 | Ross | Jan. 19, 1993 |
| 6,414,475 | Dames et al. | Jul. 02, 2002 |
| 2008/0084201 | Kojori | Apr. 10, 2008 |
| 7,358,724 | Taylor et al. | Apr. 15, 2008 |
| 6,426,632 | Clunn | Jul. 30, 2002 |
| 6,265,881 | Meliopoulos et al. | Jul. 24, 2001 |
| 5,202,621 | Reischer | Apr. 13, 1993 |
| 4,616,174 | Jorgensen | Oct. 07, 1986 |
| 4,513,274 | Halder | Apr. 23, 1985 |
| 4,096,436 | Cook et al. | Jun. 20, 1978 |
| 3,976,987 | Anger | Aug. 24, 1976 |
| 2008/0084200 | Kojori | Apr. 10, 2008 |
| 2004/0239335 | McClelland et al | Dec. 02, 2004 |
| 4,689,548 | Mechlenburg | Aug. 25, 1987 |
| 7,049,758 | Weyhrauch et al. | May 23, 2006 |
| 7,019,498 | Pippin et al. | Mar. 28, 2006 |
| 7,019,474 | Rice | Mar. 28, 2006 |
| 6,849,834 | Smolenski et al. | Feb. 01, 2005 |
| 6,774,610 | Orozco | Aug. 10, 2004 |
| 5,880,578 | Oliveira et al. | Mar. 09, 1999 |
| 5,635,826 | Sugawara | Jun. 03, 1997 |
| 4,859,926 | Wolze | Aug. 22, 1989 |
| 4,456,871 | Stich | Jun. 26, 1984 |
| 4,429,269 | Brown | Jan. 31, 1984 |
| 4,353,025 | Dobkin | Oct. 05, 1982 |
| 4,346,339 | Lewandowski | Aug. 24, 1982 |
| 2006/0103365 | Ben-Yaacov | May 18, 2006 |
| 2005/0189929 | Schulz | Sep. 01, 2005 |

SUMMARY OF THE INVENTION

The primary object of the present invention is to provide a TRIAC/SCR-based device, system and method wherein a predetermined amount of voltage below a nominal line voltage is saved, thereby conserving energy.

Another object of the present invention is to provide a TRIAC/SCR-based device, system and method wherein a predetermined amount of voltage below a nominal appliance voltage is saved, thereby conserving energy.

A further object of the present invention is to provide a TRIAC/SCR-based device, system and method that may be used for a variety of applications, including, but not limited to, whole house energy savings devices, motor controllers, small appliance regulators and any application wherein the measurement of AC current is required.

Another object of the present invention is to provide a TRIAC/SCR-based device, system and method that may be used for the following: controllers for refrigerators, freezers, air conditioners, AC electric motors and AC voltage; single, bi- and poly-phase whole house energy savings devices; commercial and industrial energy savings devices; and AC voltage controllers and regulators.

A further object of the present invention is to provide a TRIAC/SCR-based device, system and method that virtually eliminates brown outs caused by energy overload on a power grid.

An even further object of the present invention is to provide a TRIAC/SCR-based device, system and method that reduces a load on a power grid.

Another object of the present invention is to provide a TRIAC/SCR-based device, system and method that may be used to reduce the load imposed on a power grid during peak load times.

An even further object of the present invention is to provide a TRIAC/SCR-based device, system and method that permits governmental entities and/or power companies to manage power from a demand perspective as opposed to a production and/or delivery perspective.

Another object of the present invention is to provide a TRIAC/SCR-based device, system and method that is low in costs after the initial cost of the equipment utilized in the system is amortized.

Another object of the present invention is to provide a TRIAC/SCR-based device, system and method provides accurate power control and regulation.

Another object of the present invention is to provide a TRIAC/SCR-based device, system and method wherein the device may be programmed by a user for activation for a specific time and/or date period.

An even further object of the present invention is to provide a TRIAC/SCR-based device, system and method wherein a user may program individual and/or multiple energy savings percentage reductions.

A further object of the present invention is to provide a TRIAC/SCR-based device, system and method that is adaptable to a plurality of powers and/or frequencies.

A further object of the present invention is to provide a TRIAC/SCR-based device, system and method that may be small in size.

Another object of the present invention is to provide a TRIAC/SCR-based device, system and method that is preferably affordable to an end user.

An even further object of the present invention is to provide a TRIAC/SCR-based device, system and method that allows a user to manage peak demand at point of consumption rather than at point of generation.

Another object of the present invention is to provide a TRIAC/SCR-based device, system and method that provides a true root-mean-square (RMS) value of an alternating current.

A further object of the present invention is to provide a TRIAC/SCR-based device, system and method that permits effective control of direct current (DC) offset.

An even further object of the present invention is to provide a TRIAC/SCR-based device, system and method that is adaptable to a range of cyclic frequencies.

An even further object of the present invention is to provide a TRIAC/SCR-based device, system and method that accurately determines output voltage.

An even further object of the present invention is to provide a TRIAC/SCR-based device, system and method that avoids having to determine the true RMS value of a chopped sine wave.

Another object of the present invention is to provide a TRIAC/SCR-based device, system and method that avoids jitter and stability problems.

The present invention fulfills the above and other objects by providing a TRIAC/SCR-based device, system and method wherein a predetermined amount of voltage below a nominal line voltage and/or below a nominal appliance voltage is saved, thereby conserving energy. Phase input connections are provided for inputting analog signals into the device and system. A magnetic flux concentrator senses the incoming analog signal and a volts zero crossing point detector determines the zero volts crossing point of the signal. The signal is routed to a digital signal processor for processing. The signal is reduced by a driver control via pulse width modulation and the reduced amount of electricity is outputted, thereby yielding an energy savings for an end user.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 8A is a circuit diagram of a TRIAC-based energy savings device and system of the present invention;

FIG. 8B is a circuit diagram of a SCR-based energy savings device and system of the present invention;

FIG. 11 is a circuit diagram a communication means of the present invention;

FIG. 11C is a circuit diagram of a first connector of a communications means of FIG. 11 into a digital signal processor;

FIG. 11D is a circuit diagram of a second connector of a communications means of FIG. 11;

FIG. 12 is a screen shot of a windows interface of the present invention; and

DESCRIPTION OF THE PREFERRED EMBODIMENTS

Figure 1:
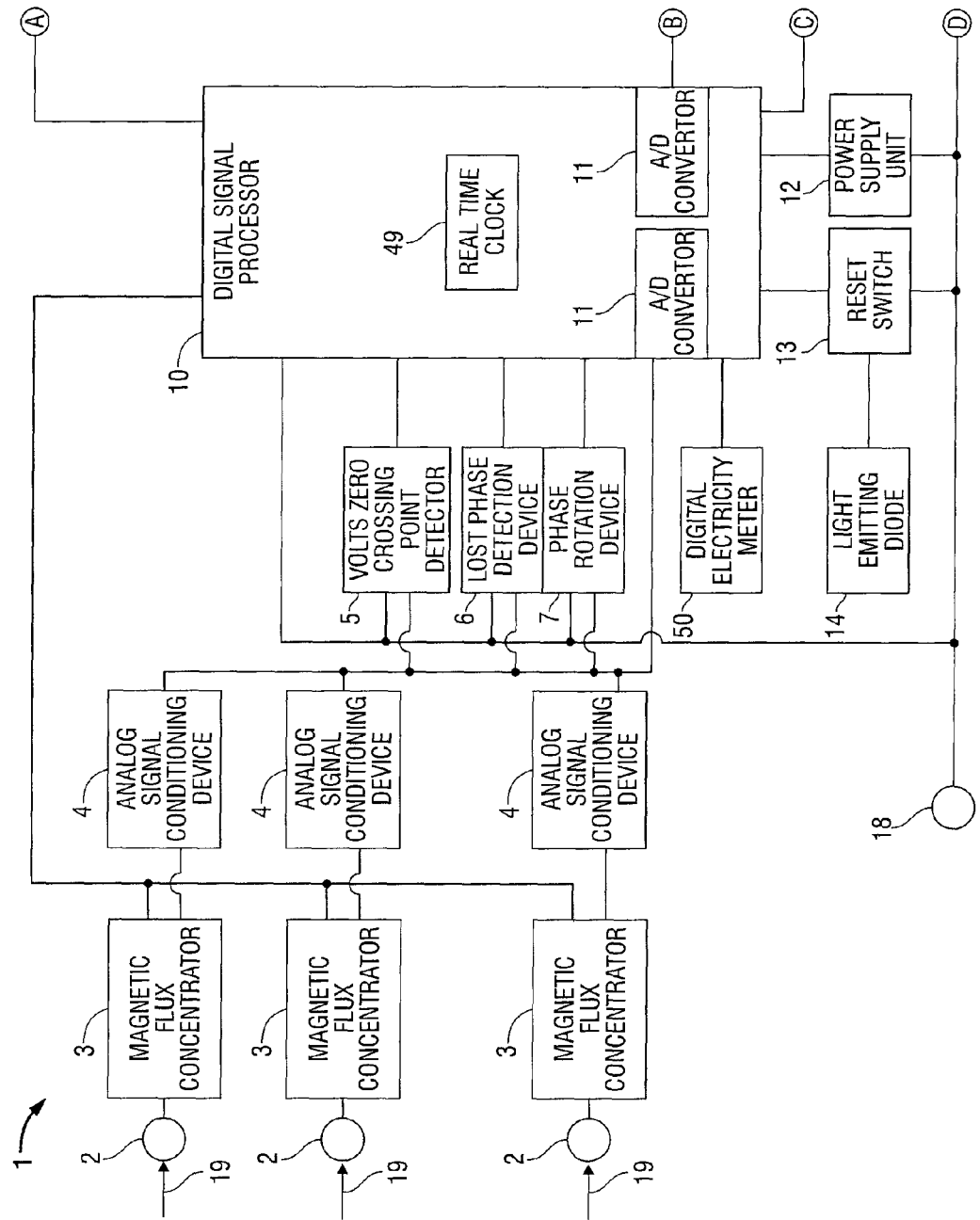
FIG. 1 is a block diagram of a TRIAC/SCR-based device and system of the present invention for use in a three-phase electrical system.
Figure 1:
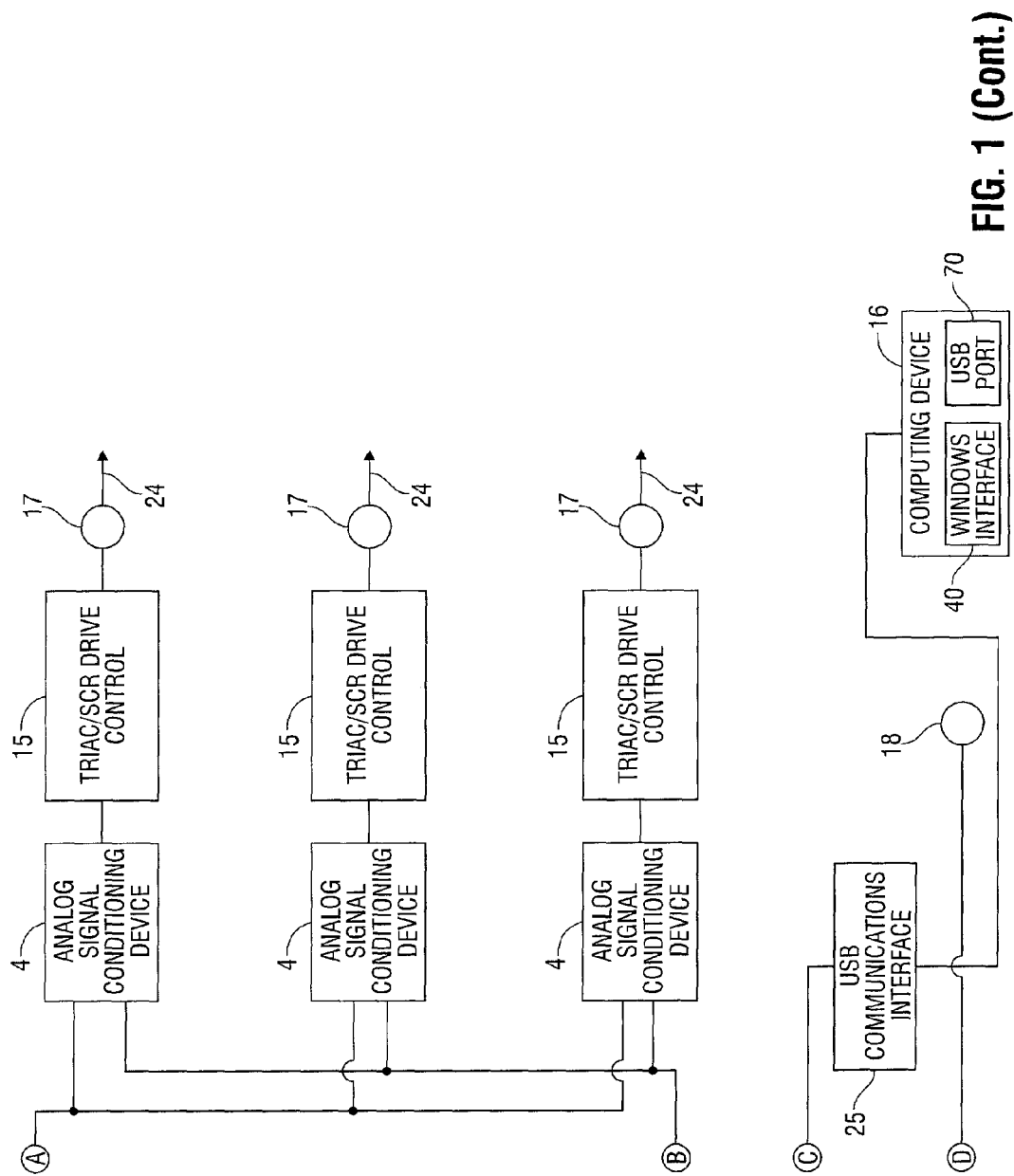

For purposes of describing the preferred embodiment, the terminology used in reference to the numbered components in the drawings is as follows:

1. TRIAC/SCR-based energy savings device and system, generally
2. phase input connection
3. magnetic flux concentrator
4. analog signal conditioning device
5. volts zero crossing point detector
6. lost phase detection device
7. phase rotation device
8. varistor
9. lower trace
10. digital signal processor
11. A/D converter
12. power supply unit
13. reset switch
14. light emitting diode
15. TRIAC/SCR drive control
16. computing device
17. phase output connection
18. neutral
19. incoming energy
20. analog signal
21. volts zero crossing point
22. positive half cycle
23. negative half cycle
24. reduced energy
25. USB communications interface
26. circuit board
27. housing
28. conductor
29. housing top half
30. housing bottom half
31. hinge
32. first connector
33. second connector
34. comparator
35. Schmidt buffer
36. inductor
37. magnetic flux concentrator chip
38. aperture
39. incoming sine wave
40. windows interface
41. main monitoring screen
42. field, generally
43. operational mode field
44. phase field
45. startup field
46. calibration field
47. setpoints field
48. indicators
49. real time clock
50. digital electricity meter
51. Schmidt-triggered inverting buffer
52. transorb device
53. diode
54. turn-on point
55. turn-off point
56. capacitor
57. transformer
58. resultant voltage modulation
59. optically-isolated TRIAC
60. terminal
61. isolator
62. integrated circuit
63. resistor
64. split rail generator
65. main TRIAC
66. square wave
67. upper trace
68. rectifier
69. transistor
70. USB port
71. operational amplifier
72. optical isolator
73. switching regulator
74. Zener diode
75. linear voltage regulator
76. isolator block
77. SCR With reference to FIG. 1, a block diagram of an energy savings device and system 1 of the present invention for use in a three-phase electrical system is shown. The energy savings device and system 1 includes various components and means for reducing the amount of energy inputted wherein the reduced energy yields a virtually non-existent or minimal effect on the performance of an electronically-operated device.

A predetermined amount of incoming energy 19 having at least one analog signal 20 therein is inputted into the device and system 1 via an inputting means, which is preferably at least one phase input connection 2. A neutral 18 line is also provided in the device and system 1. As shown in FIG. 1, the system and device 1 is utilized in a three-phase electrical system having an A-B-C phase plus neutral for use as a reference point. However, the energy savings system 1 of the present invention may be utilized in a single phase system and/or a bi-phase system as well, wherein the only difference in structure is the amount of phase input connections 2 (e.g., in a single phase system, only one phase input connection 2 is utilized in addition to a neutral connection (A) and in a bi-phase system, two phase input connections 2 are utilized (A & B) in addition to a neutral connection).

At least one phase input connection 2 is connected to at least one sensing means, which is preferably at least one magnetic flux concentrator 3, that senses the predetermined amount of incoming energy 19. The magnetic flux concentrator 3 galvanically isolates the current of the incoming energy 19 and reports any over-current conditions to a processing means, which is preferably at least one digital signal processor 10. If there are any over-current conditions, the digital signal processor 10 immediately shuts down the device and system 1 so as to safeguard the device and system 1 itself, as well as the terminal equipment used in conjunction with the device and system 1 in the event of a short circuit or overload. Thus, the digital signal processor 10 provides total protection of the power control devices in the event of a software/firmware glitch and/or power line glitch or surge in real-time as the reaction time of the digital signal processor 10 is preferably 5 μs. The digital signal processor 10 preferably includes at least one A/D converter 11.

Prior to reporting the analog value of the phase current from the phase input connection 2 to the digital signal processor 10, the magnetic flux concentrator 3 first transmits the incoming energy 19 through at least one signal conditioning means, which is preferably at least one analog signal conditioning device 4. After the signal(s) have been conditioned, a method which is described below, the conditioned signals are then sent to a volts zero crossing point determining means, which is preferably at least one volts zero crossing point detector 5, for detecting the point where the AC voltage goes through zero volts relative to neutral 18, which is commonly referred to as a volts zero crossing point 21.

After the volts zero crossing point 21 is detected and if using a three-phase electrical system, the conditioned signal then enters at least one loss detecting means, which is preferably at least one lost phase detection device 6 and at least one rotating means, which is preferably at least one phase rotation device 7, so as to prepare the signal for proper inputting into the digital signal processor 10.

The power control is executed via at least one voltage reducing means, which preferably includes at least one TRIAC/SCR drive control 15, in electrical connection with the digital signal processor 10 to reduce the energy a predetermined amount. Prior to the processed signals entering the reducing means, however, the signals may once again be conditioned through at least one analog signal conditioning device 4 so as to clean a signal to remove any spurious signals or transient signals. The command signals to exercise control of the TRIAC/SCR drive control 15 of the voltage reducing means are determined by the digital signal processor 10.

The reduced energy 24 then enters at least one outputting means, which is preferably at least one phase output connection 17, and is outputted to an electrically-operated device for consumption.

The system and device 1 is powered via a powering means, which is preferably at least one power supply unit 12 in electrical connection with the digital signal processor 10. A resetting means, which is preferably a reset switch 13, is preferably provided to permit a user to reset the device and system 1 as desired. In addition, an indicator means, such as a light emitting diode 14, may be in electrical connection with reset switch 13 so as to alert a user if the device and system 1 needs to be reset.

The device and system 1 may optionally include at least one digital electricity meter 50 and at least one communication means, such as a USB communications interface 25, capable of interfacing with at least one computing device 16 having at least one USB port 70 and at least one window interface 40 via wired or wireless transmission. The USB communications interface 25 permits a user to monitor, display and/or configure the device and system 1 via his/her computing device 16. However, inclusion of the USB communications interface 25 is not necessary in the implementation of the device and system 1. In addition, a real time clock 49 may optionally be incorporated within the digital signal processor 10 of or otherwise connected to the energy savings device and system 1.

A user may determine the operational manner in which to use the energy savings device and system 1 of the present invention, e.g., a user may select how he/she would like to save energy by either inputting the desired RMS value, inputting the desired percentage voltage or inputting the desired percentage savings reduction into a computing device 16. For example, if a user chooses to reduce the incoming voltage by a fixed percentage, the energy savings device and system 1 permits such voltage percentage reduction and automatically lowers the voltage so as to be consistent with a maximum allowed harmonic content by establishing a lower voltage threshold. The lower voltage threshold assures that in lower or brown-out conditions, the system and device 1 does not continue to attempt to reduce the available voltage by the percentage reduction specified.

Figure 2:
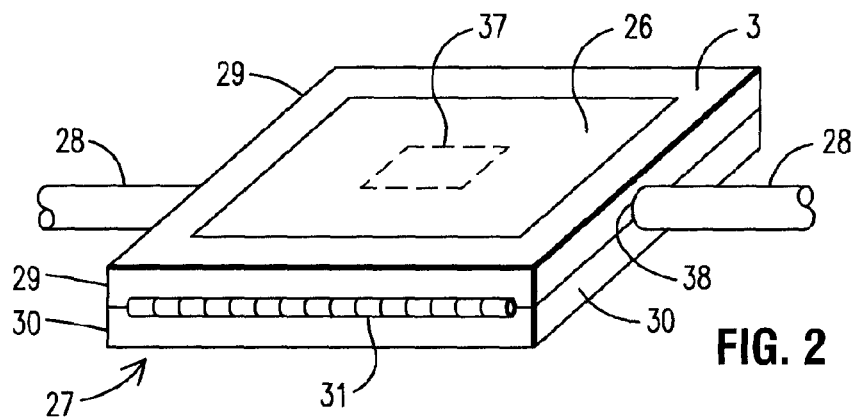
FIG. 2 is perspective plan view of a sensing means of the present invention.

FIG. 2 is perspective plan view of a sensing means of the present invention is shown. The sensing means, which is preferably at least one magnetic flux concentrator 3, measures AC current galvanically when connected to active circuitry of the device and system 1 of the present invention. A housing 27, which preferably is made of plastic, includes a housing top half 29 and a housing bottom half 30 and a hinge 30 connecting the two halves 29 and 30, carries a circuit board 26 having a magnetic flux concentrator chip 37 mounted on the bottom side of the housing top half 29. Each half 29 and 30 includes at least one notched portion wherein when the halves 29 and 30 are joined together, at least one aperture 38 is formed for permitting a conductor 28 to extend therethrough. The utilization of said housing 27 accurately defines the distance between the magnetic flux concentrator chip 37 and the core center of the conductor 28. A window detector associated with the magnetic flux concentrator chip 37 accurately determines when current, within the negative or positive half cycles, is out of a normal ranges. In addition, the magnetic flux concentrator 3 uses an open collector Schmidt buffer to allow multiple concentrators 3 to be connected to both the analog signal conditioning device 4 and the logic device 9.

The housing 27 snaps together and bears on the conductor 28, which is preferably a cable, to ensure that the conductor 28 is held firmly against the housing 27. The housing top half 29 may be formed in various sizes so as to accommodate differing wire gauges. A plurality of apertures 38 of various sizes may be formed when the halves 29 and 30 are snapped together so as to accommodate conductors 28 of various widths. The magnetic flux concentrator 3 provides galvanic isolation of the incoming energy 19, performs accurate current measurement, is adaptable to any range of currents through multiple cable passages located within the housing 27, provides high voltage galvanic isolation, has zero harmonic distortion and superb linearity. In addition, since the current measurement range is determined by mechanical means, no changes are necessary to the printed circuit board 26.

The following equation determines the approximate sensitivity:

$$V_{out}=0.06*I/(D+0.3\text{mm})$$

where I=current in the conductor 28 and D=the distance in mm from the top surface of the magnetic flux concentrator chip 37 to the center of the conductor 28.

Since no electrical connection is made to the measurement target, full galvanic isolation is achieved. Moreover, there is zero insertion loss and, therefore, no heat is dissipated nor energy lost as there is no electrical connection made nor is a shunt or a transformer used.

Figure 3:
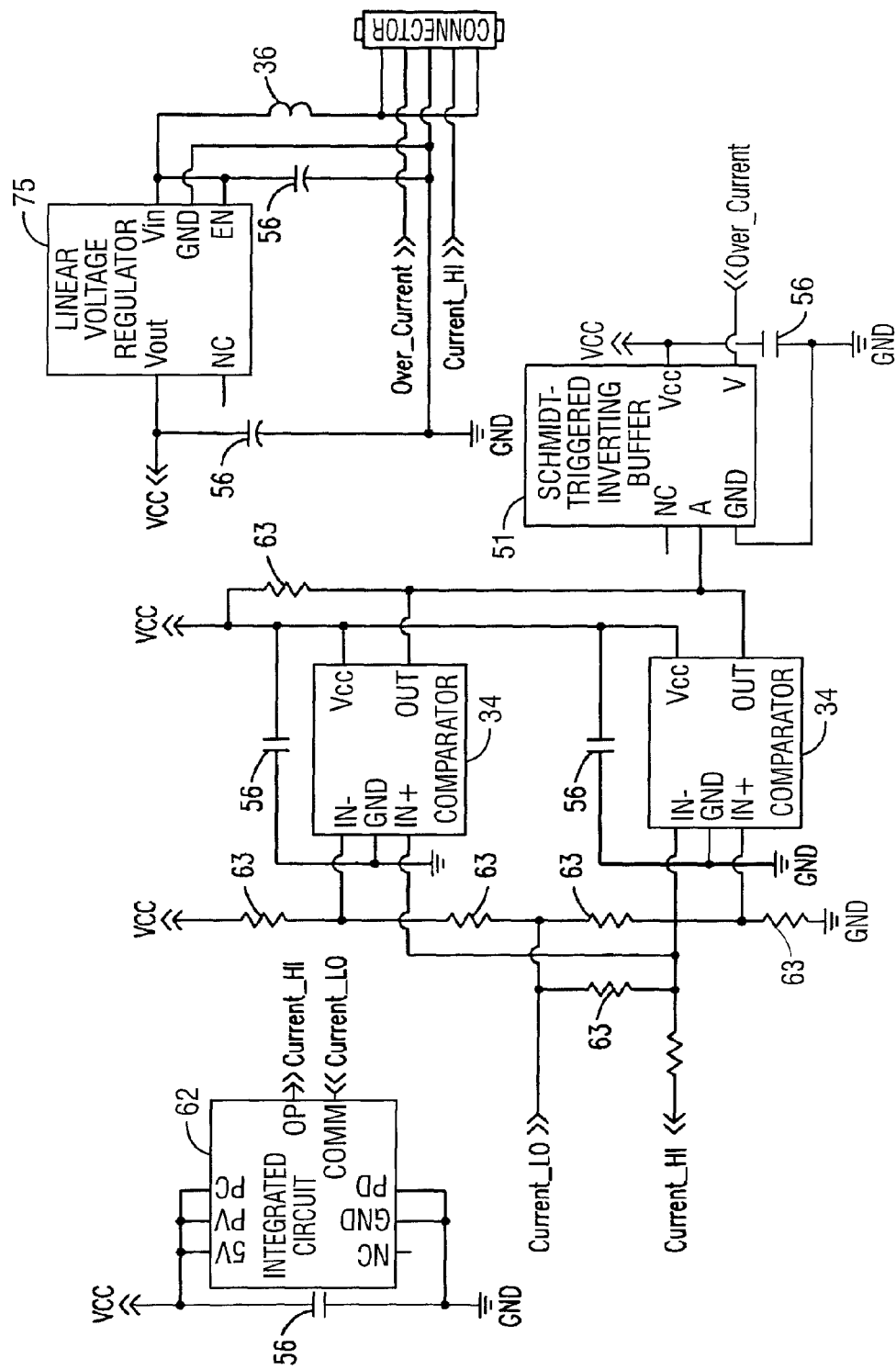
FIG. 3 is a circuit diagram of a sensing means of the present invention.

FIG. 3 is a circuit diagram of the sensing means of the present invention. The magnetic flux concentrator 3 measures the magnetic flux generated when an alternating electric current flows within the conductor 28. Over-current is accomplished by comparators 34 that form a window comparator. When the thresholds set by resistors 63 are exceeded by an output of the magnetic flux concentrator 3, which may yield a "Current_Hi" signal, open collector outputs of comparators 34 go low and pass to the logic device 9 and a microprocessor non-maskable input to shut-down the device and system 1. To avoid ground loop problems, the magnetic flux concentrator 3 preferably includes an integrated circuit 62 that regulates the operational voltage of the magnetic flux concentrator 3 to 5VDC.

Figure 4:
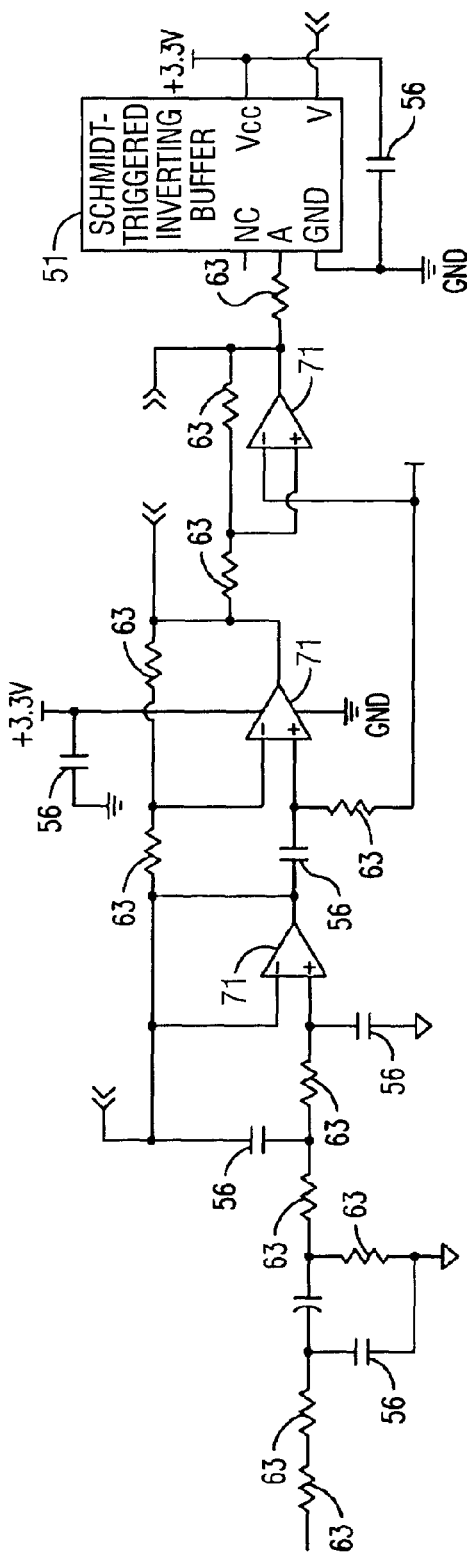
FIG. 4 is a circuit diagram of a signal conditioning means of the present invention.

With reference to FIG. 4, a circuit diagram of a signal conditioning means of the present invention is shown. The conditioning means, which is preferably at least one analog signal conditioning device 4, cleans or conditions a 50/60 Hz sine wave analog signal so as to remove any spurious signals or transient signals prior to its transmittal to the digital signal processor 10. If the sine wave has any noise or distortion of sufficient amplitude, this can, under certain circumstances, give rise to false zero cross detections. Thus, the inclusion of such analog signal conditioning device 4 is of importance.

To properly condition the sine wave signal, operational amplifiers 71 are utilized. An operational amplifier 71 is configured as an active, second order, low pass filter to remove or reduce harmonics and any transients or interfering signals that may be present. When utilizing such filter, however, group delay occurs wherein the group delay offsets, in time, the zero crossing of the filtered signal from the actual zero crossing point of the incoming sine wave 39. To remedy the delay, operational amplifiers 71 are provided to allow the phase change necessary to correct the zero crossing point accurately in time as required. The output of the operational amplifiers 71 is the fully conditioned 50/60 Hz sine wave signal that is connected to the A/D converter 11 of the digital signal processor 10 (see FIG. 1) for root-mean-square (RMS) value measurement. This signal is exactly half the supply rail which is necessary to enable measurement of both positive and negative half cycles. The A/D converter 11 performs the well-known 2s compliment math to enable same and requires the AC signal to deviate both positively and negatively with respect to the center or split rail voltage.

Figure 5:
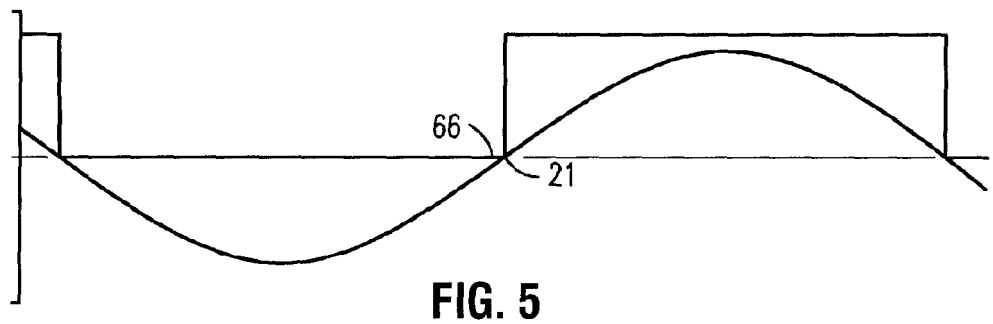
FIG. 5 is an oscillogram for a volts zero crossing point determining means of the present invention.
Figure 6:
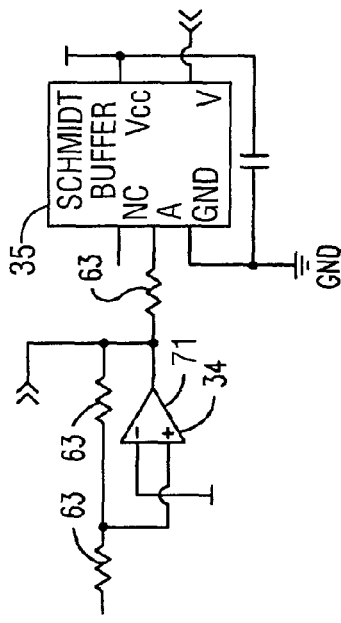
FIG. 6 is a circuit diagram for a volts zero crossing point determining means of the present invention.

FIGS. 5 and 6 show an oscillogram and circuitry diagram, respectively, for a volts zero crossing point determining means of the present invention. The volts zero crossing point determining means, which is preferably at least one volts zero crossing point detector 5 wherein the zero crossing point 21 is accurately determined. An operational amplifier 71 is configured as a comparator 34 with its reference at exactly half the supply voltage. A comparator 34 operates at a very high gain and, as a result, switches within a few millivolts of the split rail voltage.

Additional conditioning of the zero cross signal is further performed by a Schmidt buffer 35. Subsequent to the additional signal processing, a very accurate square wave 66 accurate to a few millivolts of the actual volts zero crossing point 21 of the sine wave is produced.

Figure 7:
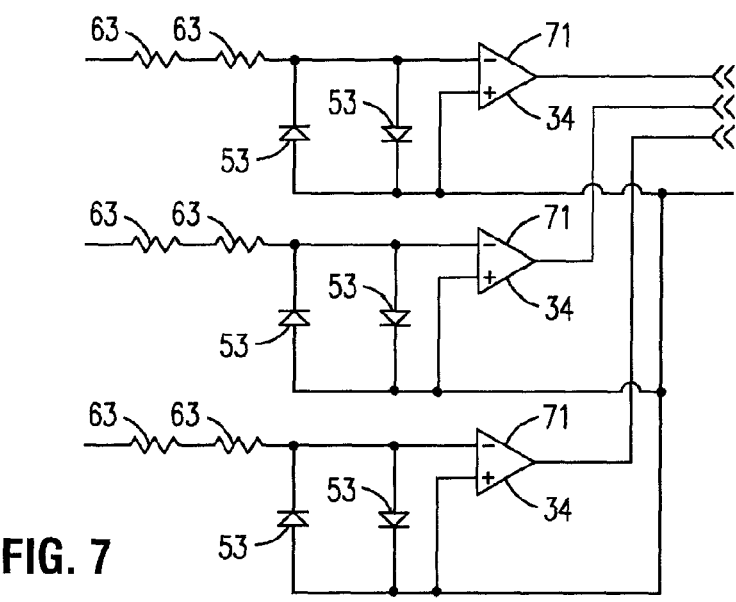
FIG. 7 is circuit diagram of a loss detecting means and phase rotation determination and rotating means of the present invention.

FIG. 7 shows a circuit diagram of a loss detecting means and phase rotation determination and rotating means of the present invention. The loss detecting means, which is preferably at least one lost phase detection device 6, and the phase rotation determination and rotating means, which is preferably at least one phase rotation device 7, work together so as to properly prepare the signal for transmittal into the digital signal processor 10 when utilizing a three-phase electrical system. The lost phase detection device 6 circuitry includes operational amplifiers 71 configured as comparators 34 where each utilizes a high value of series resistors, comprising two 0.5 Meg Ohm resistors in series, which is necessary for achieving the required working voltage of the resistors 63, and two diodes 53 connected in inverse parallel. The diodes 53 are centered around the volts zero crossing point 21 of the incoming sine wave 39 at approximately the voltage forward drop of the diodes 53, which is in turn applied to the comparator 34 that further conditions the signal suitable for passing to the digital signal processor 10, resulting in the system being shut down in the absence of any of the signals.

In a three-phase electrical system, the phase rotation may be either A-B-C or A-C-B. To enable the digital signal processor 10 to properly function, the phase rotation must first be ascertained. The comparators 34 are used to detect the volts zero crossing point(s) 21 and report the point(s) 21 to the digital signal processor 10. The digital signal processor 10, in turn, makes the rotational timing through timing logic. Each of the operational amplifiers 71 act as a simple comparator 34 with the input signal, in each case provided by the inverse parallel pairs of diodes 53 in conjunction with the series resistors 63.

Figure 8:
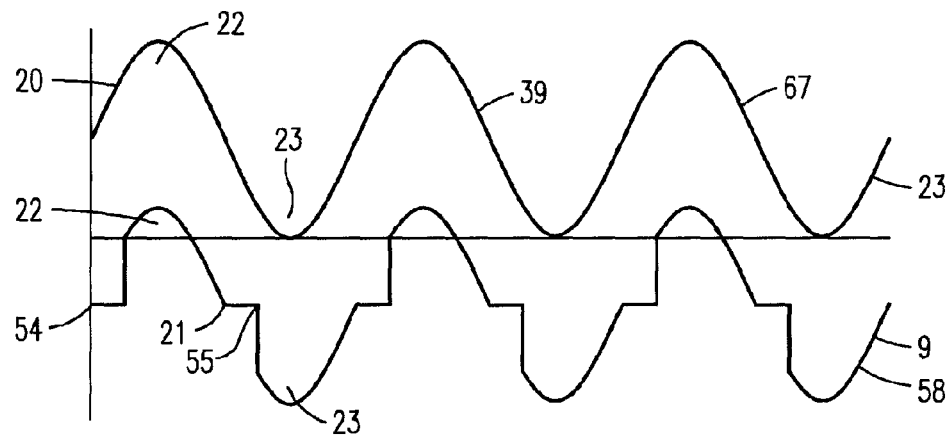
FIG. 8 is an oscillogram of an incoming sine wave before and after use of the present invention.

FIGS. 8, 8A and 8B show an oscillogram and circuit diagrams, respectively, of a voltage reducing means of the present invention. The oscillogram of FIG. 8 shows an upper trace wherein an incoming modulating sine wave 39 is shown and a lower trace 9 wherein the incoming modulating sine wave 39 reveals a reduced signal, which ultimately results in reduced energy 24. To reduce the incoming modulating sine wave 39, the energy savings device and system 1 of the present invention utilizes a TRIAC implementation or an SCR implementation, both of which are described in detail below.

The voltage reducing means, which preferably includes at least one TRIAC/SCR drive control 15, reduces the analog signals of the incoming sine wave 39, which is the amount of energy inputted into the energy savings device and system 1, by pulse width modulation wherein at least one slice per half cycle is removed from an area under the curve of the modulating sine wave 39, thereby reducing energy. The present invention works in conjunction with the inherent characteristics common to TRIAC's and SCR's that allow the turn on-point 54 to be determined by an end-user and the turn-off point 55 to be determined when the current of the incoming sine wave 39 passes through or falls close to zero. All of the potential energy is contained in each half cycle 22 and 23 and, in the case of a complete half cycle, has the greatest area under the curve if the TRIAC or SCR is triggered after the volts zero crossing point 21 as it can be seen that this area is reduced and, as a result, the energy is reduced. Modulation can be made high, at a rate at 120 Hz during 60 Hz operation and 100 Hz during 50 Hz operation. The overall effect is realized when the root-mean-square (RMS) value, which is the square root of the time average of the square of a quantity or, for a periodic quantity, the average is taken over one complete cycle and which is also referred to as the effective value, is correctly measured and the output voltage is seen to be reduced by a percentage similar to the area under the curve. Reduced voltage results in reduced current, thereby resulting in reduced power consumed by an end user.

The oscillogram of FIG. 8 illustrates both the incoming sine wave 39 on the upper trace 67 and the resultant voltage modulation 58 on the lower trace 9. It can be clearly seen that the area under the curve of the resultant voltage modulation 58 is smaller in area than that of the incoming sine wave 39 and, hence, the root-mean-square (RMS) value is reduced. The effect is apparent when the RMS is correctly measured and, in every case of firing after the zero crossing, the RMS is reduced. Reduced voltage results in reduced current which results in reduced power being consumed.

TRIAC's and SCR's are suitable for use in single appliance controls and where the current harmonics are not considered to be a problem or when feeding a load that is inductive since the inductive component of the load has a self-filtering action.

When the drive control 15 is a TRIAC implementation, as shown in FIG. 8A, an optically-isolated TRIAC 59 receives command signals from a microprocessor via a terminal 60 and triggers a main TRIAC 65 wherein transorb devices 52 are utilized. Resistors 63 and capacitors 56 are arranged as shown to assist in the absorption of switching transients and to help protect the TRIAC from line power bourn high voltage spikes.

When the drive control 15 is a SCR implementation, as shown in FIG. 8B, it is generally used when high levels of power need to be controlled. There are many similarities between the TRIAC implementation and the SCR implementation and only differ as the drive requirements of two SCR's increase the complexity of the circuitry. An additional varistor 8 is provided in the SCR implementation for three-phase electrical systems wherein the varistor 8 is controlling higher than 250 volts RMS per phase. The diodes 53 perform a drive steering function so that each SCR is triggered appropriate to its half cycle commitment.

Rather than measuring a chopped-up sine wave as performed by current energy savings devices, systems and methods, the present invention measures only the AC sine wave voltage applied and mathematically determines the firing angle required for the appropriate output true RMS value. The technique may be implemented on a cyclic basis using single or multiple cycles as appropriate. Depending upon the application, the math may be performed in real-time or via "lookup tables" having the firing angle associated with an RMS value already calculated.

The RMS value of the reduced sine wave is, essentially, a "sliced" piece of the incoming sine wave 39. In other words, the output waveform true RMS value is a portion of the incoming sine wave 39. In the case of powerline control, the incoming sine wave 39 is a sinusoid and the frequency of the sine wave 39 are constant over time. In a sampled data system, the number of samples needed to accurately measure the sliced output waveform RMS value would be prohibitively large as the sample points are not synchronized with the beginning of the sliced output waveform, thereby possibly missing a large portion of the waveform area that would be used in each calculation of the RMS value. Rather than directly sampling the output waveform to obtain the RMS in order to use a reasonably small number of samples per period of output waveform frequency, the present invention mathematically predicts where the slicing of the output sinusoid should begin relative to the input sinusoid. This calculation of area under the slice is a non-linear function that results in a high-order polynomial equation.

In a real-time controlled environment, this calculation would be too time-consuming to perform. Therefore, a table of values is provided that corresponds to the ratio of the input to output waveform table of RMS values of area under the slice for different positions within the sinusoid.

For example, the RMS value of a slice of a sinusoid at a fixed frequency where variable 'a' is the position of the beginning of the slice:

$$\text{rms\_value\_of\_slice}(a) := \sqrt{\int_a^1 \sin(\pi \cdot x)^2 \, dx}$$

which reduces to the following equation:

$$\text{rms\_value\_of\_slice}(a) := \sqrt{\frac{\sin(2 \cdot \pi \cdot a) - 2 \cdot a \cdot \pi + 2 \cdot \pi}{4 \cdot \pi}}$$

The ratio of the desired output RMS value to the input RMS value is calculated by dividing the output equation above by the RMS value of the input equation. In the case of a sinusoidal input, as is here, the RMS value of the input is a fixed value. Thus, the resulting, normalized equation is:

$$\text{rmsratio}(a) := \sqrt{\left(\frac{\sin(2 \cdot \pi \cdot a)}{2 \cdot \pi} - a + 1\right)}$$

Figure 8C:
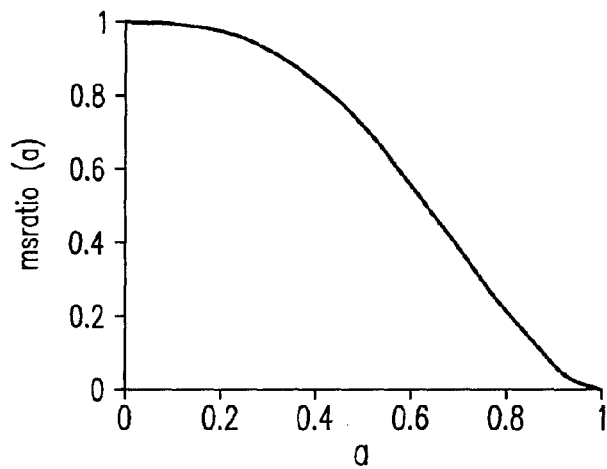
FIG. 8C is a graph of a feed-forward phase control technique of the present invention.

The curve associated with the resulting, normalized equation is shown as FIG. 8C. As the position of 'a' goes from 0 to 1, that is, from 0% to 100%, the normalized area goes from 100% of input to 0% of input in a non-linear manner. The value of 'a' can also be thought in terms of angle so that 'a' moves between 0 to 180 degrees within a half cycle of the input waveform. It is only necessary to calculate for one half-cycle as the waveform is symmetrical and squared.

The inverse of the curve of FIG. 8C is desired so as to determine what value of 'a' or where the input waveform may be sliced to obtain a desired RMS value. This may be achieved by finding the roots of the previous equation while varying the area across its full range, which ultimately results in a curve shown in FIG. 8D.

Figure 8D:
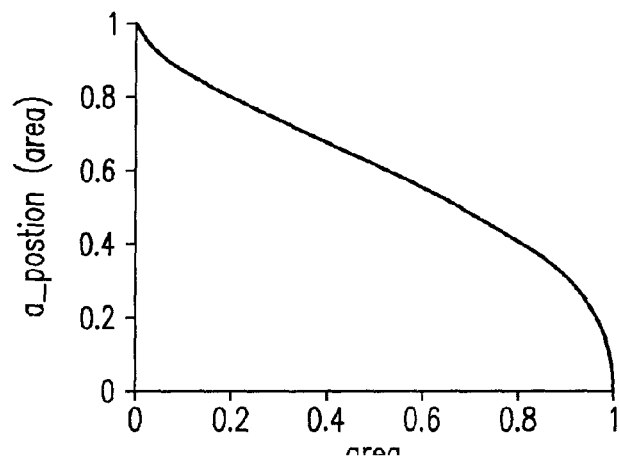
FIG. 8D is a graph of a feed-forward phase control technique of the present invention.

The curve in FIG. 8D is broken up into a number of discrete pieces and is used as output values of a lookup table. For example, if the index in the table is the ratio of the desired output RMS value divided by the sinusoidal input RMS value, the output value of the table will be a value representing a percentage of full-scale of the position of where the output waveform should start to produce the desired RMS value. The percentage of full-scale can be translated to a value between 0 to 180 degrees by multiplying the output value by 180 as follows:

a_degrees(area)=a_position(area)×180

As opposed to determining the area under 'a' in a variable system, in a control system, the position of variable 'a' is desired. In this instance, the inverse of the equation is utilized to result in a high-order polynomial non-linear equation. The inverse for a range of values for 'a' is used to construct a lookup table. The table is then used to find the position of 'a' that generates a particular RMS value of the sliced waveform.

Figure 9:
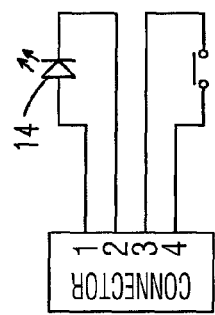
FIG. 9 is a circuit diagram of a combined resetting means and indicator means of the present invention.

With reference to FIG. 9, a circuit diagram of a combined resetting means and indicator means of the present invention is shown. The resetting means, which is preferably at least one reset switch 13, and indicator means, which is preferably at least one light emitting diode 14, work together so as to indicate when the TRIAC/SCR-based energy savings device and system 1 is not properly working and to permit a user to reset the device and system 1 as needed. Preferably, the light emitting diode 14 will indicate that the device and system 1 is working properly by flashing on/off. When in a fault condition, the light emitting diode 14 preferably changes to an uneven pattern that is immediately obvious and recognizable as a fault condition.

Figure 10:
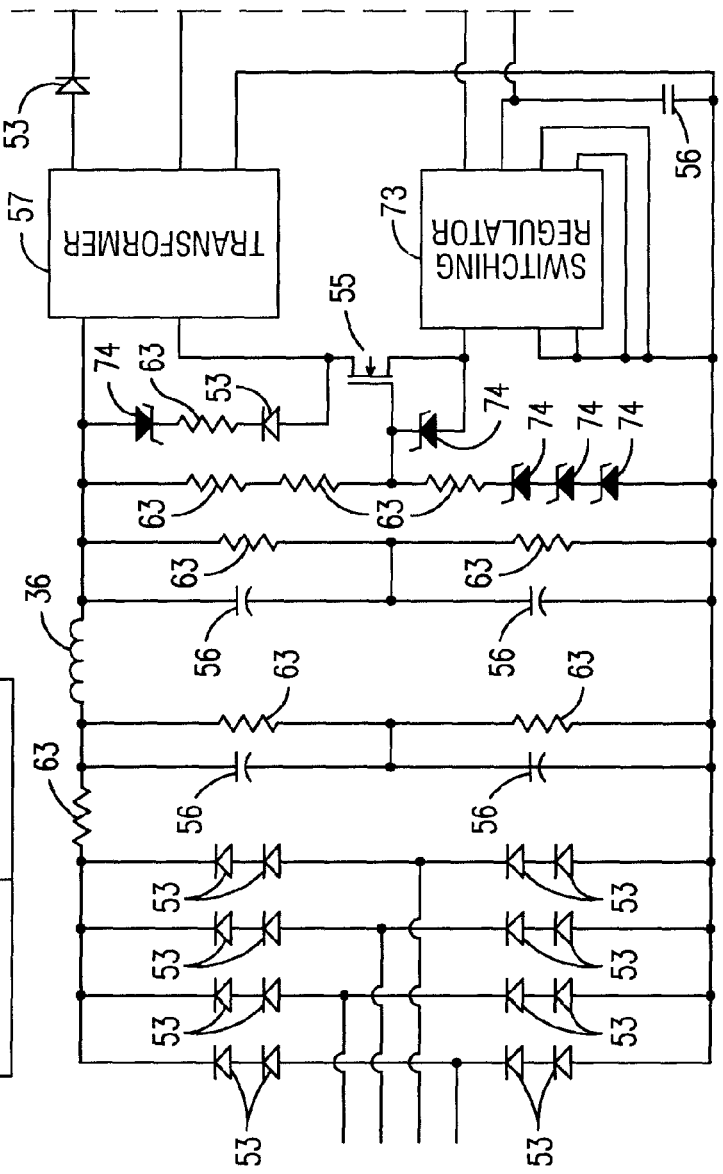
FIG. 10 is a circuit diagram of a power supply unit of a powering means of the present invention.
Figure 10A:
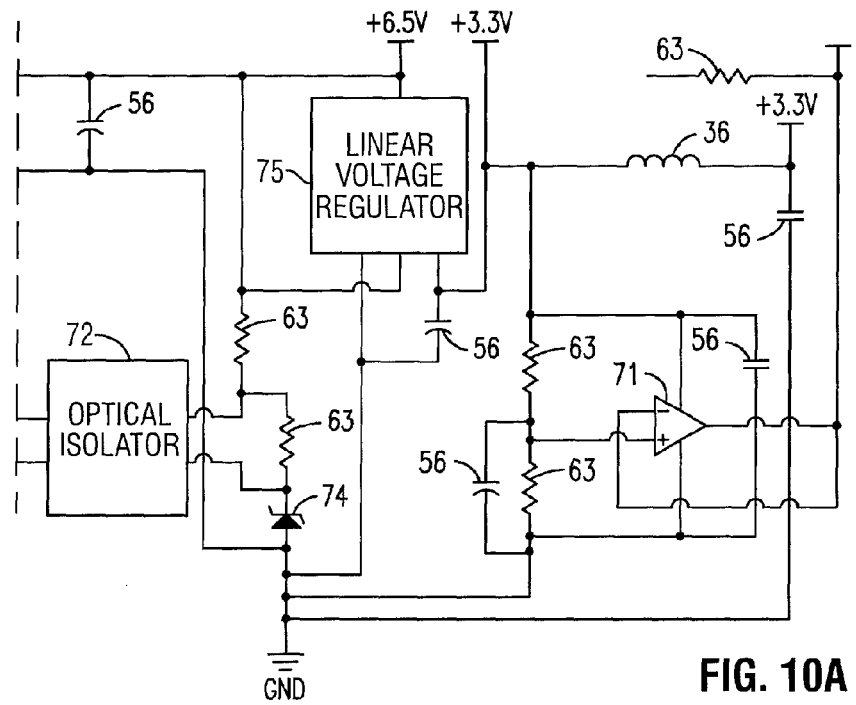
FIG. 10A is a continuation of the circuit diagram of FIG. 10.

FIGS. 10 and 10A is a circuit diagram of a power supply unit 12 of a powering means of the present invention. The powering means, which is preferably at least one power supply unit 12, accepts a variety of inputs, including, but not limited to, single phase 80Vrms to 265V$_{rms}$, bi-phase 80V$_{rms}$ to 600V$_{rms}$, three-phase 80V$_{rms}$ to 60V$_{rms}$ and 48 Hz to 62 Hz operation.

The power supply unit 12 is fully-isolated and double-regulated in design. At the input, a rectifier 68 composed of diodes 53 accepts single, bi- and three-phase power. The power is applied to a switching regulator 73 and integrated circuit 62 via a transformer 57. In view of the large voltages existing across the DC terminals, the switching regulator and integrated circuit 62 is supplemented by a transistor 69 employed in a StackFET configuration in order to raise its working voltage. The secondary transformer 57 has a diode 53 and a reservoir capacitor 56. The DC voltage across capacitor 56 is passed via the network resistors 63 and a diode 53 and a Zener diode 74 to an optical isolator 72 and finally to the feedback terminals. Use of the optical isolator 72 guarantees galvanic isolation between the main rectifier and the supply output (6.4V DC). Finally, the output of the linear voltage regulators 75 (3.3VA DC) is passed to an operational amplifier 71, which is configured as a unity gain buffer with two resistors 63 that set the split rail voltage. The main neutral is connected to this split rail point and also a zero Ohm resistor. An inductor 78 isolates the supply rail digital (+3.3V) from the analog (3.3VA) and reduce noise.

Next, FIGS. 11, 11A, 11B, 11C and 11D show the circuitry of a communication means of the present invention. The communication means, which is preferably at least one USB communications interface 25, permits a user to monitor and set the parameters of the energy savings device and system 1 of the present invention as desired.

Figure 11A:
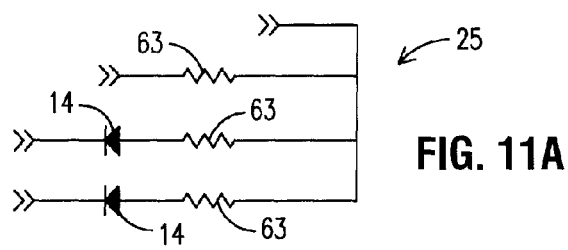
FIG. 11A is a circuit diagram of a USB interface of a communications means of FIG. 11.
Figure 11B:
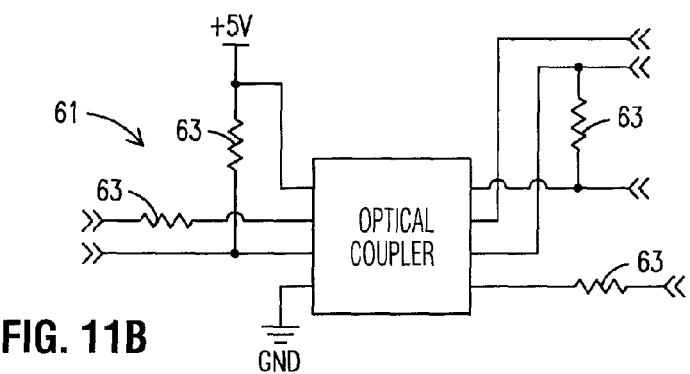
FIG. 11B is a circuit diagram of an isolator of a communications means of FIG. 11.

The circuitry of a USB communications interface 25 is shown in FIG. 11A, an isolator block 76 utilized in isolating the USB communications interface 25 from the digital signal processor 10 is shown in FIG. 11B and first and second connectors 32 and 33 for connecting the communications means to the digital signal processor 10 are shown in FIGS. 11C and 11D.

Since the main printed circuit board is not isolated from neutral, it is necessary to galvanically isolate the USB communications interface 25. Use is made of the built-in serial communications feature of the digital signal processor 10 to serially communicate with the communication means. Signals, on the user side of the isolation barrier, are applied to an integrated circuit 62, which is a device that takes serial data and translates it to USB data for direct connection to a computing device 16 via a host USB port 70. The host USB 5V power is used to power the communication means and voids the necessity of providing isolated power from the unit. Preferably, there are two activity light emitting diodes 14, that indicate activity on the TX (transmit) and RX (receive) channels. Communications preferably operates at 9600 Baud, which is adequate in view of the small amount of data passed.

Although the inclusion of a communications means is not necessary in the performance of the energy savings device and system 1, it is a feature that permits easier use of the device and system 1.

Figure 13:
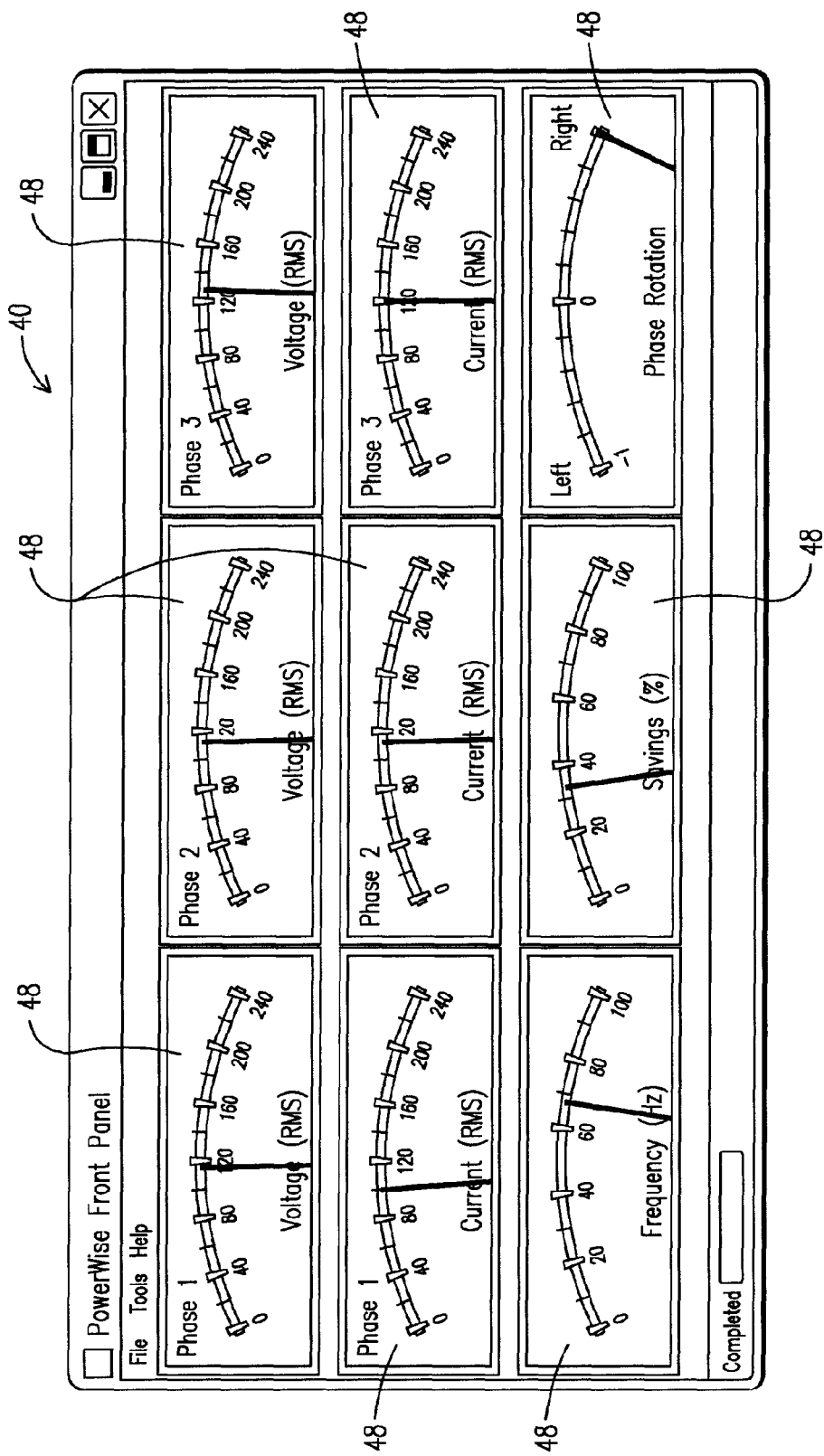
FIG. 13 is a screen shot of a windows interface of the present invention.

Finally, with reference to FIGS. 12 and 13, screen shots of a windows interface 40 of the present invention are shown. The windows interface 40 is displayed on the computing device 16 and permits a user to monitor and configure the energy savings device and system 1 as desired. A main monitoring screen 41 having a plurality of fields 42 in which an end user may adjust the energy savings device and system 1 is provided. For example, the fields 42 may include an operational mode field 43, a phase field 44, a startup field 45, a calibration field 46 and a setpoints field 47.

In the operational field 43, a user may select the manner in which he/she/it desires to conserve energy. The manners include voltage reduction percentage wherein the output volts is adjusted by a fixed percentage, savings reduction percentage wherein the output volts is aimed at achieving a savings percentage and voltage regulation wherein the root-mean-square value output is a pre-set value.

The phase field 44 permits a user to select the phase type used in connection with the energy savings device and system 1, i.e., single phase, bi-phase or three phase.

The startup field 45 permits a user to configure the system and device 1 to randomly start or to have a delayed or "soft start" wherein the user input the delay time in seconds in which the system and device will start.

The calibration field 46 permits a user to input the precise calibrations desired and/or to rotate the phases.

The setpoints field 47 displays the settings selected by the user and shows the amount of energy saved by utilizing the energy savings device and system 1 as voltage regulation, voltage reduction percentage or power savings reduction percentage. With respect to percentage voltage reduction, the lower limit RMS is set below the incoming voltage passed therethrough to permit the incoming voltage to be passed through when it is less than or equal to the lower limit voltage. With respect to the percentage savings reduction, the lower limit RMS is set below the incoming voltage passed therethrough.

Indicators 48 are provided on the windows interface 40 and display operating current, operating voltage, line frequency, calculated power savings and phase rotation.

A real time clock 49 may be incorporated into the windows interface 40 to allow programming of additional voltage reduction for a predetermined time and a predetermined operational time, e.g., for seasons, days of the week, hours of the day, for a predetermined operational time. In addition, a user may program the energy savings device and system 1 to operate during various times of the day. The real time clock 49 is set through a communications port or fixed to allow the selection of defined seasonal dates and time when, through experience, are known to exhibit power grid overload. During these times, the system allows further reduction of the regulated AC voltage, thereby reducing the load on the grid. Multiple time can be defined each with its own additional percentage reduction or voltage drop.

A digital electricity meter 50 provides a means to log statistical data on power usage, power factor and surges. The digital electricity meter 50 also provides the ability to include capacitors for power factor correction, operates on single, bi and three-phase systems and operates on all world wide voltages. It may be used remotely or locally to disable or enable the user's power supply at will by the provider. In addition, the digital electricity meter 50 may detect when the energy savings device and system 1 has been bridged by an end user attempting to avoid paying for energy consumption wherein the provider is alerted to such abuse. Finally, use of a real time clock 49 permits a user and/or provider to reduce the consumption of power at selected times of a day or for a selected time period, thereby relieving and/or eliminating brown-out conditions.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. An TRIAC/SCR-based energy savings device comprising:
    at least one phase input connection for inputting a predetermined amount of incoming energy having at least one analog signal into said energy savings device, wherein said at least one analog signal is an AC signal;
    at least one sensing means connected to said at least one phase input connection for sensing said predetermined amount of incoming energy entered into said energy savings device;
    at least one volts zero crossing point detector in electrical connection with said at least one phase input connection for determining at least one zero volts crossing point of said at least one analog signal;

at least one digital signal processor in electrical connection with said at least one volts zero crossing point detector for processing said at least one analog signal;

at least one voltage reducing means having at least one drive control wherein said at least one voltage reducing means is in electrical connection with said at least one digital signal processor for reducing said predetermined amount of incoming energy by providing pulse width modulation to the at least one analog signal to yield a reduced amount of energy; and at least one phase output connection in electrical connection with said at least one voltage reducing means for outputting said reduced amount of energy out of said energy savings device;

wherein said digital signal processor is configured to determine a firing angle of said at least one analog signal that will provide a predetermined root-mean-square voltage; and wherein said at least one drive control is configured to reduce said predetermined amount of incoming energy to said predetermined root-mean-square voltage using said firing angle.

2. The TRIAC/SCR-based energy savings device of claim 1 further comprising:

at least one analog signal conditioning device for conditioning said at least one analog signal of said energy exiting said at least one sensing means;

wherein said at least one drive control comprises a first SCR device and a second SCR device arranged as an inverse parallel pair.

3. The TRIAC/SCR-based energy savings device of claim 2 wherein:

said at least one analog signal conditioning device has a first filter for removing or reducing harmonics and transients or interfering signals of said energy exiting said at least one magnetic flux concentrator.

4. The TRIAC/SCR-based energy savings device of claim 3 wherein:

said at least one analog signal conditioning device has a second filter for permitting at least one phase change if necessary.

5. The TRIAC/SCR-based energy savings device of claim 2 further comprising:

at least one power supply unit in electrical connection with said energy savings device for powering said energy savings device;

wherein a transorb and a varistor are each connected across said first and second SCR devices.

6. The TRIAC/SCR-based energy savings device of claim 5 further comprising:

at least computing device in electrical connection with said energy savings device;

wherein a resistor and a capacitor are connected in series across said first and second SCR devices.

7. The TRIAC/SCR-based energy savings device of claim 6 further comprising:

at least one USB communications interface in electrical connection between said at least one digital signal processor and said at least one computing device;

wherein an optically isolated driver is configured to turn on said first and second SCR devices.

8. The TRIAC/SCR-based energy savings device of claim 7 wherein:

said at least one sensing means comprises a magnetic flux concentrator that is configured to measure said predetermined amount of incoming energy via galvanic isolation; and wherein said sensing means further comprises two comparators configured as a window comparator to pass a signal to said digital signal processor in an over current condition.

9. The TRIAC/SCR-based energy savings device of claim 7 wherein:

said at least one USB communications interface permits a user to monitor said predetermined amount of energy inputted into said energy savings system and said reduced energy outputted from said energy savings system.

10. The TRIAC/SCR-based energy savings device of claim 1 wherein:

said at least one drive control comprises a TRIAC device.

11. The TRIAC/SCR-based energy savings device of claim 10 wherein:

a transorb and a varistor are each connected across said TRIAC device; and a resistor and a capacitor in series are connected across said TRIAC device.

12. The TRIAC/SCR-based energy savings device of claim 1 wherein:

said at least one sensing means is a magnetic flux concentrator that measures said predetermined amount of energy via galvanic isolation.

13. The TRIAC/SCR-based energy savings device of claim 12 wherein:

said magnetic flux concentrator is located on at least one printed circuit board;

said at least one printed circuit board is located on at least one housing; and said housing is removably securable to a conductor electrically connecting said at least one phase input connection to said at least one analog signal conditioning device.

14. The TRIAC/SCR-based energy savings device of claim 13 wherein:

said at least one housing includes a top half and a bottom half hingedly secured to one another.

15. The TRIAC/SCR-based energy savings device of claim 1 wherein:

said at least one volts zero crossing point detector for determining at least one volts zero crossing point of said at least one analog signal is at least one comparator and at least one Schmidt buffer.

16. The TRIAC/SCR-based energy savings device of claim 15 wherein:

said at least one comparator has a reference point of approximately half a supply voltage.

17. The TRIAC/SCR-based energy savings device of claim 1 further comprising:

at least one lost phase detection device in electrical connection with said at least one analog signal conditioning device.

18. The TRIAC/SCR-based energy savings device of claim 17 further comprising:

at least one phase rotation device in electrical connection with said at least one analog signal conditioning device.

19. The TRIAC/SCR-based energy savings device of claim 1 further comprising:

at least one floating power supply in electrical connection with said at least one voltage reducing means.

20. The TRIAC/SCR-based energy savings device of claim 1 wherein:
said at least one phase output connection is a single phase output system.

21. The TRIAC/SCR-based energy savings device of claim 1 wherein:
said at least one phase output connection is a bi-phase output system.

22. The TRIAC/SCR-based energy savings device of claim 1 wherein:
said at least one phase output connection is a three-phase output system.

23. The TRIAC/SCR-based energy savings device of claim 1 further comprising:
at least one reset switch in electrical connection with said at least one digital signal processor.

24. The TRIAC/SCR-based energy savings device of claim 23 further comprising:
at least one light emitting diode in electrical connection with said at least one reset switch.

25. The TRIAC/SCR-based energy savings device of claim 1 further comprising:
at least one phase rotation device in electrical connection with said at least one analog signal conditioning device.

26. An TRIAC/SCR-based energy savings device comprising:
at least one power supply unit in electrical connection with said energy savings device for powering said energy savings device;
at least one phase input connection for inputting a predetermined amount of incoming energy having at least one analog signal into said energy savings device;
at least one sensing means connected to said at least one phase input connection for sensing said predetermined amount of incoming energy entered into said energy savings device via galvanic isolation;
at least one analog signal conditioning device for conditioning said at least one analog signal of said energy exiting said at least one magnetic flux concentrator;
at least one volts zero crossing point detector in electrical connection with said at least one phase input connection for determining at least one zero volts crossing point of said at least one analog signal;
at least one digital signal processor in electrical connection with said at least one volts zero crossing point detector for processing said at least one analog signal;
at least one voltage reducing means having at least one drive control wherein said at least one voltage reducing means is in electrical connection with said at least one digital signal processor for reducing said predetermined amount of incoming energy to yield a reduced amount of energy by providing pulse width modulation to the at least one analog signal;
at least one phase output connection in electrical connection with said at least one voltage reducing means for outputting said reduced energy out of said energy savings device;
at least one reset switch in electrical connection with said at least one digital signal processor;
at least one USB communications interface in electrical connection with said at least one digital signal processor; and
at least computing device in electrical connection with said energy savings device;
wherein said digital signal processor is configured to determine a firing angle of said at least one analog signal that will provide a predetermined root-mean-square voltage; and
wherein said at least one drive control is configured to reduce said predetermined amount of incoming energy to said predetermined root-mean-square voltage using said firing angle.

27. The TRIAC/SCR-based energy savings device of claim 26 further comprising:
at least one phase rotation device in electrical connection with said at least one analog signal conditioning device;
wherein said at least one drive control comprises a first SCR device and a second SCR device arranged as an inverse parallel pair; and
wherein a transorb and a varistor are each connected across said first and second SCR devices.

28. An TRIAC/SCR-based energy savings system comprising:
a means for inputting a predetermined amount of incoming energy into said energy savings system;
a means for sensing said predetermined amount of incoming energy entered into said energy savings system;
a means for conditioning at least one analog signal of said energy;
a means for determining at least one volts zero crossing point of said at least one conditioned analog signal;
a means for processing said at least one conditioned analog signal;
a means for reducing said at least one conditioned analog signal of said predetermined amount of energy to yield a reduced amount of energy; and
a means for outputting said reduced energy out of said energy savings system;
wherein said means for processing is configured to determine a firing angle of said at least one analog signal that will provide a predetermined root-mean-square voltage; and
wherein said at least one drive control is configured to reduce said predetermined amount of incoming energy to said predetermined root-mean-square voltage using said firing angle.

29. The TRIAC/SCR-based energy savings system of claim 28 wherein:
said means for reducing comprises a first SCR device and a second SCR device arranged as an inverse parallel pair; and
said means for reducing said predetermined amount of energy is via pulse width modulation.

30. The TRIAC/SCR-based energy savings system of claim 29 further comprising:
a transorb and a varistor each connected across said first and second SCR devices; and
a means for communicating with at least one computing device.

31. The TRIAC/SCR-based energy savings system of claim 30 further comprising:
a resistor and a capacitor connected in series across said first and second SCR devices; and
a means for resetting said energy savings system.

32. The TRIAC/SCR-based energy savings system of claim 31 further comprising:
an optically isolated driver configured to turn on said first and second SCR devices; and
a means for communicating with at least one computing device.

33. The TRIAC/SCR-based energy savings system of claim 31 further comprising:
a means for detecting loss of said means for inputting a predetermined amount of energy into said energy savings system.

34. The TRIAC/SCR-based energy savings system of claim 33 wherein:
said means for detecting loss of said means for inputting a predetermined amount of energy into said energy savings system is at least one lost phase detection device in electrical connection with said means for conditioning said at least one analog signal of said energy.

35. The TRIAC/SCR-based energy savings system of claim 30 further comprising:
a means for communicating with at least one computing device.

36. The TRIAC/SCR-based energy savings system of claim 28 wherein:
said means for determining at least one volts zero crossing point of said at least one conditioned analog signal is at least one volts zero crossing point detector having at least one comparator and at least one Schmidt buffer.

37. The TRIAC/SCR-based energy savings system of claim 28 further comprising:
a means for calculating a location on said at least one conditioned analog signal where said at least one analog signal should be reduced to determine a root-mean-square value.

38. The TRIAC/SCR-based energy savings system of claim 37 wherein:
said means for calculating a location on said at least one conditioned analog signal where said at least one analog signal should be reduced to determine a root-mean-square value is by determining at least one firing angle of said at least one conditioned analog signal.

39. The TRIAC/SCR-based energy savings system of claim 38 further comprising:
a means for comparing said at least one conditioned analog signal to said at least one analog signal to determine a ratio wherein said ratio is equal to a predefined root-mean-square value.

40. The TRIAC/SCR-based energy savings system of claim 28 wherein:
said means for processing said at least one conditioned analog signal is at least one digital signal processor that performs a pulse width modulation function.

41. The TRIAC/SCR-based energy savings system of claim 28 wherein:
said means for reducing is configured to provide pulse width modulation via at least one TRIAC device.

42. The TRIAC/SCR-based energy savings system of claim 41 further comprising:
an isolated optically coupled driver configured to turn-on and turn-off said TRIAC device; and
a resistor and a capacitor connected in series across said TRIAC device.

43. The TRIAC/SCR-based energy savings system of claim 28 further comprising:
a means for powering said energy savings system.

44. The TRIAC/SCR-based energy savings system of claim 28 wherein:
said means for sensing said predetermined amount of energy entered into said energy savings system is at least one magnetic flux concentrator that measures current with galvanic isolation; and
wherein said means for sensing further comprises two comparators configured as a window comparator to pass a signal to said means for processing in an over current condition.

45. The TRIAC/SCR-based energy savings system of claim 28 wherein:
said means for conditioning at least one analog signal of said energy is at least one analog signal conditioning device that substantially reduces harmonics and any transients or interfering signals in said at least one analog signal; and
wherein said means for reducing utilizes pulse width modulation with a TRIAC device.

46. The TRIAC/SCR-based energy savings system of claim 28 further comprising:
a means for rotating said means for inputting a predetermined amount of energy into said energy savings system.

47. The TRIAC/SCR-based energy savings system of claim 46 wherein:
said means for rotating said means for inputting a predetermined amount of energy into said energy savings system is at least one phase rotation device in electrical connection with said means for conditioning said at least one analog signal of said energy.

48. A method for using an TRIAC/SCR-based energy savings device comprising at least one phase input connection for inputting a predetermined amount of incoming energy having at least one analog signal into said energy savings device; at least one sensing means connected to said at least one phase input connection for sensing said predetermined amount of incoming energy entered into said energy savings device; at least one volts zero crossing point detector in electrical connection with said at least one phase input connection for determining at least one zero volts crossing point of said at least one analog signal; at least one digital signal processor in electrical connection with said at least one volts zero crossing point detector for processing said at least one analog signal; at least one voltage reducing means having at least one drive control wherein said at least one voltage reducing means is in electrical connection with said at least one digital signal processor for reducing said predetermined amount of incoming energy by providing pulse width modulation to the at least one analog signal to yield a reduced amount of energy; and at least one phase output connection in electrical connection with said at least one voltage reducing means for outputting said reduced energy out of said energy savings device, said method comprising steps of:
a. inputting a predetermined amount of energy having at least one analog signal into said energy savings device;
b. sensing said predetermined amount of energy entered into said energy savings device;
c. determining at least one volts zero crossing point of said at least one analog signal;
d. processing said at least one analog signal;
e. determining a firing angle of said at least one analog signal that provides a predetermined root-mean-square voltage;
f. reducing said predetermined amount of energy by providing pulse width modulation to said at least one analog signal using said firing angle; and
g. outputting said reduced amount of energy out of said energy savings device;
wherein said outputted energy is said predetermined root-mean-square voltage.

49. The method of claim 48 further comprising a step after step c of:

detecting at least one loss of said at least one phase input connection;

wherein said step of reducing is performed with said at least one drive control utilizing a first SCR device and a second SCR device arranged as an inverse parallel pair.

50. The method of claim 49 further comprising the steps of:

reporting said at least one loss to said at least one digital signal processor; and clamping a first spike of energy during a first switching operation with a transorb device connected across said first and second SCR devices.

51. The method of claim 50 further comprising a step after reporting said at least one loss to said at least one logic device of:

rotating remaining phase input connections.

52. The method of claim 51 further comprising a step after processing said at least one analog signal of:

conditioning said at least one analog signal.

53. The method of claim 49 further comprising a step after detecting at least one loss of said at least one phase input connection of:

rotating remaining phase input connections.

54. The method of claim 48 further comprising a step after step d of:

conditioning said at least one analog signal.

55. The method of claim 48 further comprising a step prior to step a of:

powering said energy savings device;

wherein said step of reducing is performed with said at least one drive control utilizing a TRIAC device to provide pulse width modulation.

56. The method of claim 48 further comprising a step prior to step a of programming an energy savings amount into said energy savings device.

57. The method of claim 48 further comprising a step after step f of:

programming an energy savings amount into said energy savings device.

58. The method of claim 57 further comprising a step after powering said energy savings device of:

programming an energy savings amount into said energy savings device.

59. The method of claim 48 prior to step e of:

pulse width modulating said at least one analog signal.

60. The method of claim 48 further comprising a step prior to step f of:

pulse width modulating said at least one analog signal.

61. The method of claim 48 further comprising a step after step e of:

sensing said reduced amount of energy.

62. The method of claim 48 wherein:

said pulse width modulation is accomplished via at least one TRIAC.

63. The method of claim 48 wherein:

said pulse width modulation is accomplished via at least one SCR.

64. The method of claim 48 further comprising a step after step d of:

calculating a location on said at least one conditioned analog signal where said at least one analog signal should be reduced to determine a root-mean-square value.

65. The method of claim 64 wherein:

said location on said at least one conditioned analog signal where said at least one analog signal should be reduced to determine a root-mean-square value is calculated by determining a firing angle of said at least one conditioned analog signal.

66. The method of claim 65 further comprising a step after calculating a location on said at least one conditioned analog signal where said at least one analog signal should be reduced to determine a root-mean-square value of:

comparing said at least one conditioned analog signal to said at least one analog signal to determine a ratio wherein said ratio is equal to a predetermined root-mean-square value.

* * * * *